US009559845B2

(12) United States Patent
Ignatchenko et al.

(10) Patent No.: US 9,559,845 B2
(45) Date of Patent: Jan. 31, 2017

(54) SYSTEMS, METHODS AND APPARATUSES FOR THE SECURE TRANSMISSION OF MEDIA CONTENT

(71) Applicant: OLogN Technologies AG, Triesen/FL (LI)

(72) Inventors: Sergey Ignatchenko, Innsbruck (AT); Dmytro Ivanchykhin, Kiev (UA)

(73) Assignee: OLogN Technologies AG, Triesen/FL (LI)

( * ) Notice: Subject to any disclaimer, the term of this patent is extended or adjusted under 35 U.S.C. 154(b) by 0 days.

(21) Appl. No.: 13/775,696

(22) Filed: Feb. 25, 2013

(65) Prior Publication Data

US 2013/0232339 A1 Sep. 5, 2013

Related U.S. Application Data

(60) Provisional application No. 61/605,684, filed on Mar. 1, 2012, provisional application No. 61/639,029, filed on Apr. 26, 2012.

(51) Int. Cl.
*H04L 12/40* (2006.01)
*H04L 9/08* (2006.01)
(Continued)

(52) U.S. Cl.
CPC .......... *H04L 9/0894* (2013.01); *H04L 9/0825* (2013.01); *H04L 9/14* (2013.01); *H04N 21/2347* (2013.01);
(Continued)

(58) Field of Classification Search
CPC .............................................. H04L 12/40104
(Continued)

(56) References Cited

U.S. PATENT DOCUMENTS 5,001,752 A 3/1991 Fischer
5,189,700 A 2/1993 Blandford
(Continued)

FOREIGN PATENT DOCUMENTS

DE 102 33 959 A1 1/2004
EP 1 657 931 A2 5/2006
(Continued)

OTHER PUBLICATIONS

Alattar et al., "Improved Selective Encryption Techniques for Secure Transmission of MPEG Video Bit-Streams," International Conference on Image Processing, vol. 4, pp. 256-260 (1999).
(Continued)

*Primary Examiner* — Josnel Jeudy
(74) *Attorney, Agent, or Firm* — Arnold & Porter LLP

(57) ABSTRACT

The systems, methods and apparatuses described herein permit encrypted media content to be displayed by a display device under control of a local device. The local device may comprise a computer processor to control playing of the encrypted media content and a first communication interface to transmit an association encryption envelope and, according to the control, the encrypted media content. The display device may comprise a second communication interface coupled to the first interface to receive the encrypted media content and the association encryption envelope, a decryption engine to decrypt the association encryption envelope using a private key of the display device to recover a symmetric encryption key used to encrypt the encrypted media content and decrypt the encrypted media content using the recovered symmetric encryption key, and a decoder to decode the decrypted media content for display on a display screen according to the control.

34 Claims, 13 Drawing Sheets

(51) Int. Cl.
*H04N 21/2347* (2011.01)
*H04N 21/266* (2011.01)
*H04N 21/4405* (2011.01)
*H04N 21/4623* (2011.01)
*H04N 21/472* (2011.01)
*H04N 21/6334* (2011.01)
*H04N 21/835* (2011.01)
*H04L 9/14* (2006.01)

(52) U.S. Cl.
CPC .... *H04N 21/26613* (2013.01); *H04N 21/4405* (2013.01); *H04N 21/4623* (2013.01); *H04N 21/47202* (2013.01); *H04N 21/63345* (2013.01); *H04N 21/835* (2013.01); *H04L 2209/60* (2013.01)

(58) Field of Classification Search
USPC ........... 380/42–44; 713/169–171; 726/27–30
See application file for complete search history.

(56) References Cited

U.S. PATENT DOCUMENTS

| | | |
|---|---|---|
| 5,500,897 A | 3/1996 | Hartman, Jr. |
| 5,727,065 A | 3/1998 | Dillon |
| 5,815,484 A | 9/1998 | Smith et al. |
| 6,061,452 A | 5/2000 | Suzuki |
| 6,157,719 A | 12/2000 | Wasilewski et al. |
| 6,226,387 B1 | 5/2001 | Tewfik et al. |
| 6,385,596 B1 | 5/2002 | Wiser et al. |
| 6,571,344 B1 | 5/2003 | Sitnik |
| 6,785,401 B2 | 8/2004 | Walker et al. |
| 6,996,248 B2 | 2/2006 | Fudge et al. |
| 7,020,635 B2 | 3/2006 | Hamilton et al. |
| 7,088,661 B2 | 8/2006 | Suzuki et al. |
| 7,120,250 B2 | 10/2006 | Candelore |
| 7,151,832 B1 | 12/2006 | Fetkovich et al. |
| 7,213,005 B2 | 5/2007 | Mourad et |
| 7,215,770 B2 | 5/2007 | Pedlow, Jr. et al. |
| 7,286,667 B1 | 10/2007 | Ryal |
| 7,292,691 B2 | 11/2007 | Candelore et al. |
| 7,310,423 B2 | 12/2007 | Hobrock et al. |
| 7,320,069 B1 | 1/2008 | Sundharraj et al. |
| 7,336,787 B2 | 2/2008 | Unger et al. |
| 7,343,495 B2 | 3/2008 | Kambayashi et al. |
| 7,409,562 B2 | 8/2008 | Kahn et al. |
| 7,480,314 B2 | 1/2009 | Kim |
| 7,577,846 B2 | 8/2009 | Kudelski et al. |
| 7,738,676 B1 | 6/2010 | Evans et al. |
| 7,760,879 B2 | 7/2010 | Unger et al. |
| 7,805,399 B2 | 9/2010 | Pinder et al. |
| 7,853,531 B2 | 12/2010 | Lao et al. |
| 7,853,800 B2 | 12/2010 | Watson et al. |
| 7,929,483 B2 | 4/2011 | Kimball et al. |
| 7,949,878 B2 | 5/2011 | Trinkel |
| 8,069,116 B2 | 11/2011 | Gilliam et al. |
| 2001/0046066 A1* | 11/2001 | Ueda et al. ................... 358/1.15 |
| 2002/0026636 A1 | 2/2002 | LeComte |
| 2002/0044658 A1 | 4/2002 | Wasilewski et al. |
| 2002/0048367 A1 | 4/2002 | Maillard |
| 2002/0051539 A1 | 5/2002 | Okimoto et al. |
| 2002/0169970 A1 | 11/2002 | Candelore |
| 2002/0170054 A1 | 11/2002 | Kudelski et al. |
| 2002/0196939 A1 | 12/2002 | Unger et al. |
| 2002/0198845 A1 | 12/2002 | Lao et al. |
| 2003/0021205 A1 | 1/2003 | Suzuki et al. |
| 2003/0026423 A1 | 2/2003 | Unger et al. |
| 2003/0081776 A1 | 5/2003 | Candelore |
| 2003/0097575 A1* | 5/2003 | Owada ................... H04N 5/913 713/189 |
| 2003/0145329 A1 | 7/2003 | Candelore |
| 2003/0196085 A1 | 10/2003 | Lampson et al. |
| 2004/0006542 A1 | 1/2004 | Gilliam et al. |
| 2004/0039704 A1 | 2/2004 | Gilliam et al. |
| 2004/0095879 A1 | 5/2004 | Mons et al. |
| 2004/0133908 A1 | 7/2004 | Smith et al. |
| 2004/0168184 A1 | 8/2004 | Steenkamp et al. |
| 2004/0237100 A1 | 11/2004 | Pinder et al. |
| 2005/0005114 A1 | 1/2005 | Medvinsky |
| 2005/0005286 A1 | 1/2005 | Koskela et al. |
| 2005/0021989 A1 | 1/2005 | Johnson et al. |
| 2005/0028192 A1 | 2/2005 | Hooper et al. |
| 2005/0086666 A1* | 4/2005 | Nason et al. ................. 719/321 |
| 2005/0195814 A1 | 9/2005 | Hagiwara et al. |
| 2005/0226132 A1 | 10/2005 | Inokuchi et al. |
| 2006/0023752 A1 | 2/2006 | Kim |
| 2006/0050883 A1 | 3/2006 | Walker et al. |
| 2006/0053077 A1 | 3/2006 | Mourad et al. |
| 2006/0064759 A1 | 3/2006 | Agranat |
| 2006/0095792 A1 | 5/2006 | Hurtado et al. |
| 2006/0107285 A1 | 5/2006 | Medvinsky |
| 2006/0146686 A1 | 7/2006 | Kim et al. |
| 2006/0150211 A1 | 7/2006 | Ritter |
| 2006/0174329 A1 | 8/2006 | Dublish |
| 2006/0248336 A1* | 11/2006 | Bruns et al. ................... 713/171 |
| 2006/0259790 A1 | 11/2006 | Asokan et al. |
| 2007/0086593 A1 | 4/2007 | Denning et al. |
| 2007/0192789 A1 | 8/2007 | Medford |
| 2007/0195667 A1 | 8/2007 | Ishida |
| 2007/0294170 A1 | 12/2007 | Vantalon et al. |
| 2008/0144821 A1* | 6/2008 | Armstrong ..................... 380/216 |
| 2008/0183623 A1 | 7/2008 | Xu et al. |
| 2009/0031431 A1 | 1/2009 | Boccon-Gibod |
| 2009/0070582 A1 | 3/2009 | Aura et al. |
| 2009/0106847 A1 | 4/2009 | Krupman et al. |
| 2009/0132698 A1 | 5/2009 | Barnhill, Jr. |
| 2009/0158029 A1* | 6/2009 | Wheeler et al. .............. 713/155 |
| 2010/0014666 A1* | 1/2010 | Park .................. H04N 7/1675 380/210 |
| 2010/0054698 A1* | 3/2010 | Isozaki et al. ................... 386/94 |
| 2010/0058484 A1 | 3/2010 | Jogand-Coulomb et al. |
| 2010/0077215 A1* | 3/2010 | Placin .......................... 713/171 |
| 2010/0100729 A1 | 4/2010 | Read et al. |
| 2010/0131968 A1 | 5/2010 | Newell et al. |
| 2010/0251282 A1 | 9/2010 | Howcroft |
| 2010/0278339 A1* | 11/2010 | Frenkel et al. ............... 380/210 |
| 2010/0287585 A1 | 11/2010 | Frondal et al. |
| 2010/0293570 A1 | 11/2010 | Teraoka et al. |
| 2011/0010735 A1 | 1/2011 | Newell |
| 2011/0093883 A1 | 4/2011 | Sun |
| 2011/0107107 A1 | 5/2011 | Gantman et al. |
| 2011/0113443 A1 | 5/2011 | Yu et al. |
| 2011/0129116 A1 | 6/2011 | Thorwirth |
| 2011/0138410 A1 | 6/2011 | Sansom |
| 2011/0191587 A1* | 8/2011 | Tian .......................... H04L 9/32 713/168 |
| 2012/0011567 A1 | 1/2012 | Cronk et al. |
| 2012/0036365 A1 | 2/2012 | Kyslov et al. |
| 2012/0051541 A1* | 3/2012 | Wang et al. ................. 380/255 |
| 2012/0158645 A1* | 6/2012 | Shafiee ................. G06Q 10/06 707/607 |
| 2012/0297413 A1 | 11/2012 | Choi et al. |
| 2013/0090129 A1 | 4/2013 | Turner et al. |

FOREIGN PATENT DOCUMENTS

| | | |
|---|---|---|
| JP | 08-147767 | 6/1996 |
| WO | WO 99/18506 A1 | 4/1999 |
| WO | WO 00/27067 A1 | 5/2000 |
| WO | WO 01/52020 A1 | 7/2001 |
| WO | WO 02/086725 A1 | 10/2002 |
| WO | WO 2005/081523 A1 | 9/2005 |
| WO | WO 2007/142816 A2 | 12/2007 |
| WO | WO 2009/015220 A2 | 1/2009 |
| WO | WO 2009/088919 A1 | 7/2009 |

OTHER PUBLICATIONS

Kwon et al., "Advanced A/V Encryption Technique for Digital Rights Management," International Symposium on Communications and Information Technologies, pp. 521-526 (2006).

(56) References Cited

OTHER PUBLICATIONS

Roy et al., "Secured Selective Encryption Algorithm for MPEG-2 Video," 3$^{rd}$ International Conference on Electronics Computer Technology (ICECT), pp. 420-423 (2011).

Servetti et al., "Frequency-Selective Partial Encryptionof Compressed Audio," IEEE International Conference on Acoustics, Speech, and Signal Processing Proceedings, vol. 5, pp. 668-671 (2003).

Tosun et al., "Efficient Multi-Layer Coding and Encryption of MPEG Video Streams," International Conference on Multimedia and Expo, vol. 1, pp. 119-122 (2000).

Linnartz et al., "System Aspects of Copy Management for Digital Video," IEEE International Conference on Multimedia and Expo (2000).

Liu et al., "Secure Video Multicast Based on Partial Desynchronized Fingerprint and Partial Encryption," Digital Watermarking—Lecture Notes in Computer Science, 5041:335-349 (2008).

Pedroncelli et al., "Secure Multimedia Databases," Dissertation submitted in fulfilment of the requirements for the degree of Masters in Natural Science in Computer Science in the Faculty of Science at the Rand Afrikaans University, Sep. 2002.

Lee et al., "Temporal Feature Modulation for Video Watermarking," IEEE Transactions on Circuits and Systems for Video Technology, 19(4):603-608 (2009).

Sun et al, "A Secure and Robust Approach to Scalable Video Authentication," International Conference on Multimedia and Expo, 2:209-212 (2003).

Lian et al., "Secure Media Content Distribution Based on the Improved Set-Top Box in IPTV," IEEE Transactions on Consumer Electronics, 54(2):560-566 (2008).

Shigetomi et al., "An Anonymous Loan System Based on Group Signature Scheme," LNCS 2433, pp. 244-256 (2002).

Babatope, Intellectual Property Protection in the Age of Open Access and Digital Rights Management—Balancing the Odds, printed from the Internet on or about Jan. 12, 2012.

Holankar, "Streaming Media Security Using Digital Rights Management," A Thesis Presented to the Faculty of the Department of Computer Science, San Jose State University (2003).

Sornum, "Transport Delivery Methods and Security Implementation for D-Cinema-to-Home," Manuscript in Partial Fulfillment of the Assessment Requirements for DC6129: Directed Reading at Nanyang Technological University, (2007).

International Search Report for International Application No. PCT/IB2013/000361 dated Jun. 7, 2013.

Written Opinion for International Application No. PCT/IB2013/000361 dated Jun. 7, 2013.

International Search Report for International Application No. PCT/IB2013/000678 dated Jul. 23, 2013.

Written Opinion for International Application No. PCT/IB2013/000678 dated Jul. 23, 2013.

International Search Report for International Application No. PCT/IB2013/000331, dated Jun. 20, 2013.

Written Opinion for International Application No. PCT/IB2013/000331, dated Jun. 20, 2013.

Anonymous, Cryptographic Nonce, Wikipedia, The Free Encyclopedia, edited by FrescoBot, Feb. 2012.

\* cited by examiner

SYSTEMS, METHODS AND APPARATUSES FOR THE SECURE TRANSMISSION OF MEDIA CONTENT

RELATED APPLICATIONS

This application claims priority to U.S. Provisional Applications 61/605,684 filed Mar. 1, 2012 and 61/639,029, filed Apr. 26, 2012, both entitled "Systems, Methods and Apparatuses for the Secure Transmission of Media Content," the content of these two applications are incorporated by reference herein in their entireties.

FIELD OF THE DISCLOSURE

The systems, methods and apparatuses described herein relate to the improved protection of digital media content and the field of digital rights management.

BACKGROUND

The problem of media content piracy and digital rights management (DRM) is both well-known and significant. At the present time, there is no reliable way to provide both video and audio content to end-users while simultaneously preventing them from making unauthorized, digital copies of the media. To make things worse, digital copies of the media can often be produced without any loss in quality. One known weak point in the transmission of media content from an internet store to a local device, such as a desktop computer, laptop or a smartphone, is the operating system of the local device. Both the operating system and/or the applications running under it can be easily attacked by the end-user.

What is needed are systems, methods and apparatuses for precluding software-based methods of content duplication by end-users. While other methods of unauthorized content duplication (e.g., hardware or server-side software) may still exist (due to the very nature of content delivery), these attacks are much more technically complicated than software replication, and fewer numbers of individuals engage in these. Thus, precluding software-only content duplication, which is the most widespread form of media content piracy, will severely limit numbers of the content pirates capable of such copying.

DETAILED DESCRIPTION

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, interfaces, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

The present disclosure comprises systems, methods and apparatuses for the secure transmission of media content from any type of media distribution outlet capable of electronically providing digital media content (e.g., an internet store, a television broadcast facility, a radio broadcast facility, etc.), to a local device (e.g., a smartphone, desktop computer, laptop, set-top box, etc.), running an operating system and possibly one or more applications, and then from the local device to a display device (e.g., a television set or monitor, etc.), for presentation on the device's screen. In another embodiment, media content may be transmitted directly from the media distribution outlet to a combined local device/display device for presentation on the screen. For example, a laptop might function both as the local device and the display device. Secure transmission of the media content from the media distribution outlet to the display device, whether via a local device or not, may be accomplished through a combination of symmetric and public-private key cryptography.

Figure 1:
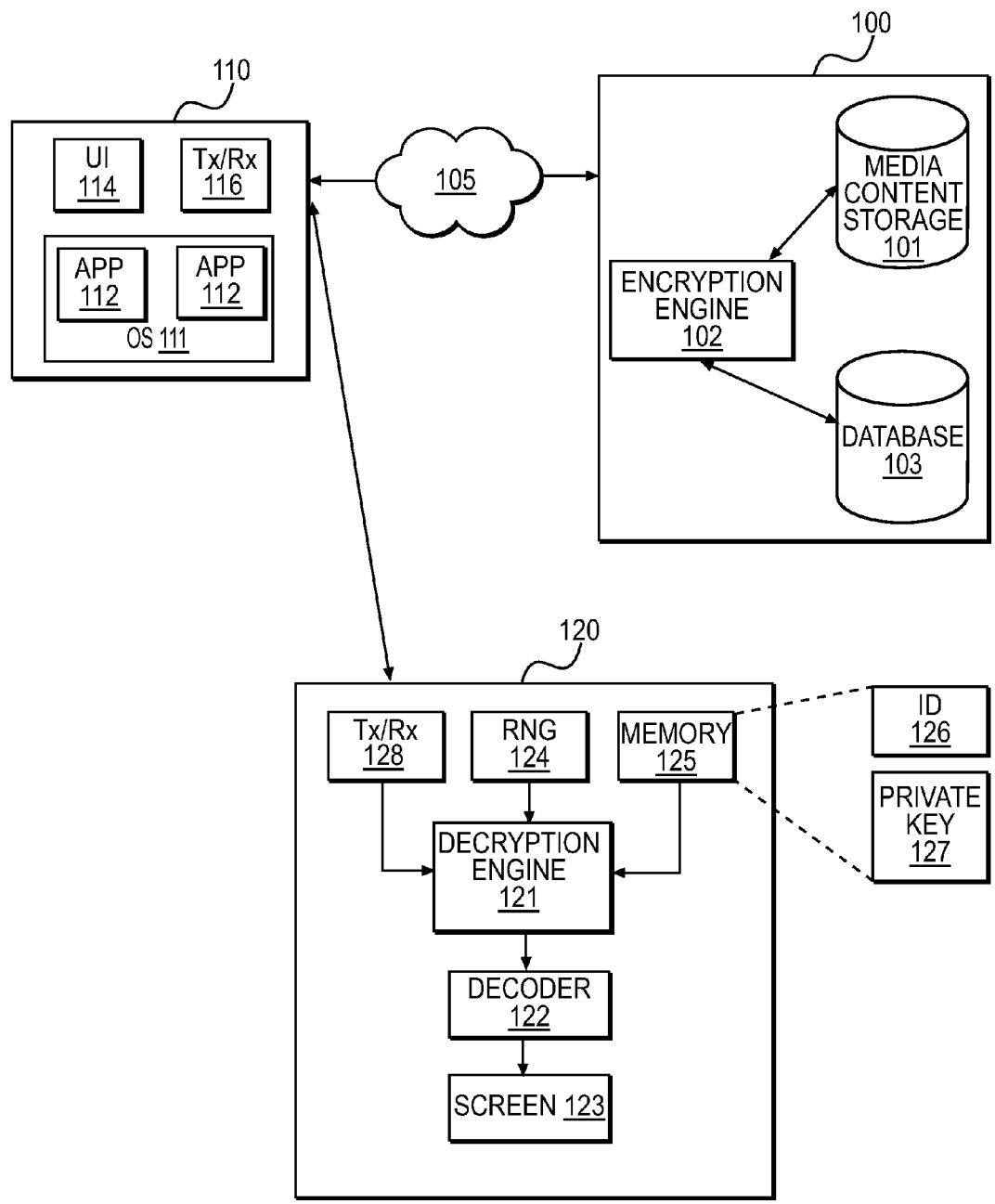
FIG. 1 is a block diagram of an exemplary system according to the present disclosure.

FIG. 1 shows a block diagram of an exemplary system according to the present disclosure. Each display device 120 may be assigned a unique identifier 126, such as a serial number. Ideally, this ID is hardcoded in the device (e.g., at the time of manufacture it can be stored in nonvolatile memory 125), such that it cannot be changed. Each display device 120 may also be assigned an encryption key, such as a unique private key (of a public/private key pair). Each device 120 may possess a decryption engine 121 capable of performing both symmetric and asymmetric decryption. For example, in one embodiment, the decryption engine 121 may implement RSA-2048 for public/private cryptography, and AES-256 for symmetric cryptography. Depending on the overall system needs, other ciphers alternatively may be used. As described in greater detail below, this functionality will allow the decryption engine 121 to a) decrypt a symmetric key previously encrypted with a public key associated with the device 120, and b) to decrypt media content data previously encrypted with the symmetric key. In some embodiments, the public key of a public/private key pair may also function as the unique identifier 126 of the device 120.

Each display device 120 may further comprise a decoder 122 capable of decoding media content. "Media content" as used throughout refers to any visual data and/or audio data, such as, but not limited to, still images, pictures or graphics, text, movies, video clips, two-dimensional animation, web pages, video games, three-dimensional images or video (including three-dimensional animation), or any combination of the foregoing. As such, the decoder 122 may be configured to decode media content in a variety of formats such as PNG, JPEG, H.264 AVC, MPEG-2, and/or VC-1. In addition, the decoder 122 may support decoding of audio formats. Depending on the embodiment, the decryption engine 121 and the decoder 122 may be implemented as software running on a processor (not shown) of the display device 120. For example, if the display device 120 includes a Micro Controller Unit (MCU) (not shown), the decryption engine and decoder may be implemented as software running on the MCU. It will be understood, however, that these units may also be implemented in hardware, or in a hybrid software/hardware solution. In some embodiments the display device 120 may include additional components and functionality. For example, in some embodiments the data signal from the decoder 122 may be forwarded to a video post processing unit (not shown), the purpose of which is to improve the overall video quality before it is transmitted to the screen 123 for display.

As shown on FIG. 1, the system may further comprise a local device 110 which may be, for example, a desktop computer, laptop, set-top box, etc. The local device 110 may comprise a user interface 114, an operating system 111, one or more applications 112 (though it will be understood that there may be any number of applications or none at all) running under the operating system 111, and one or more communications ports 116 capable of communicating with the communications port 128 of the display device 120 and/or with the media distribution outlet 100. In the discussion that follows, certain functionalities or capabilities of the local device 110 may be described as being performed by or encompassed within the operating system 111 or within an application program 112. It is to be understood that these exemplary embodiments are not intended to limit the scope of the present disclosure. Any functionality or capability of the local device may be performed by or embodied in any combination of the operating system 111, application program(s) 112, and/or specialized hardware.

Each local device 110 and display device 120 may further comprise one or more communications ports 116 and 128, respectively, by which it may transmit and receive media content, identifying information, and other information. The one or more communication ports 116 and 128 may be comprised of any combination of hardware and/or software appropriate for establishing and maintaining two-way communications, including, but not limited to, wired protocols such as serial, parallel, Ethernet, and USB, and wireless protocols such as Bluetooth, near field communications, infrared, various flavors of IEEE 802.11, and/or custom connectors/protocols. It is to be understood, however, that these references are merely exemplary, and the invention is not limited to any specific form of communications technology.

Media content may be stored within the data storage 101 of a media distribution outlet 100, such as an internet store, a television broadcast facility, a radio broadcast facility, a cable television headend, etc. One having ordinary skill in the art will understand that such a media distribution outlet 100 could be implemented, for example, using a group of servers connected to a communications network 105 (e.g., the Internet). In certain embodiments, the media distribution outlet 100 may further comprise an encryption engine 102 capable of a) generating symmetric keys, b) performing symmetric encryption, and/or c) performing asymmetric encryption. The media encryption engine (either alone or in conjunction with other computer(s), server(s) and/or component(s) (not shown) comprising the media distribution outlet) may also be capable of creating partially encrypted media content containers as described later herein. Like the decryption engine 121 of the display device 120, the encryption engine 102 of the media distribution outlet 100 may support any number of cryptographic algorithms, such as RSA-2048 and AES-256. The media distribution outlet 100 may further comprise a database 103 capable of storing the display devices' 120 unique IDs and public keys (if database 103 is relational, this could be represented, by way of example, as (TV ID, TV public key) rows), as well as generated symmetric keys, and information about the content, which a user has already purchased.

In other embodiments, the encryption engine 102 and/or the database 103 may be physically and/or logically separated from the media distribution outlet 100 and its associated media content stored in media content storage 101. For example, a centralized entity may possess device IDs and public keys, such that individual media distribution outlets 100 may contact this entity to obtain access to device IDs and public keys. In this manner, media content sellers/distributors themselves would not need to possess the information (and update it as new devices are manufactured), but could simply access the centralized entity. In some embodiments this entity could also be responsible for performing some or all of the necessary encryption and could then pass encrypted data back to the media distribution outlet 100 for further use and transmission.

Figure 2:
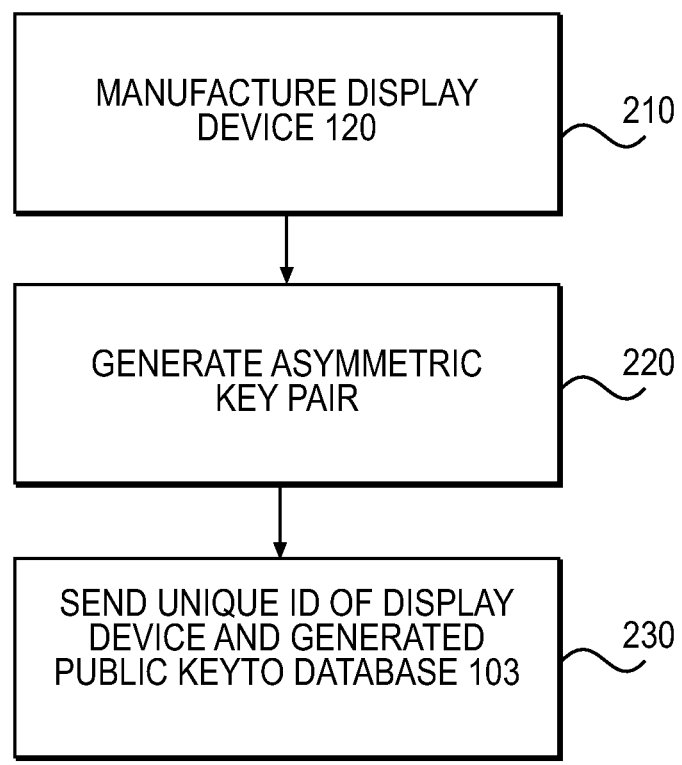
FIGS. 2-5 show flow diagrams of exemplary methods of preparing and transmitting media content according to the present disclosure.

FIG. 2 shows an exemplary manufacturing process for a display device 120 and its associated unique ID and public/private key pair. At step 210, a display device 120 is manufactured and a unique ID 126 (e.g., a serial number) may be assigned to and stored within the device 120. At step 220, a public/private key pair may be generated and assigned to and stored within the device 120. In one embodiment, the public/private key pair may be generated using a hardware-based random number generator (RNG) 124 (such as, for example, a thermal-noise based or Zener noise-based generator) located within display device 120. The private key 127 may be stored within the nonvolatile memory 125 on the device 120, such that it cannot be extracted from the device 120 or otherwise compromised (for example, the memory 125 may be tamper-resistant or, at the very least, tamper-evident). The public key, on the other hand, may be stored in the memory 125 in a manner such that it can be retrieved from, or transmitted externally to, the device 120 (for example, to share the public key with the media distribution outlet 100) retrieved from, or transmitted externally by, the display device 120. In other embodiments, the public/private key pair can be generated externally, and the private key 127 can be transferred into the display device 120. In this case, RNG 124 may not be required. Both the unique ID 126 and the private key 127 may be stored within a non-volatile memory 125 (e.g., Flash memory) of the device 120. Regardless of how the key pair is generated, to enhance security, the display device 120 should not be capable of transmitting or otherwise revealing the private key 127. In some embodiments, the public key may also function as the unique identifier 126.

At step 230, the device's unique ID 126 and public key may be provided to the media distribution outlet 100 for future use. For example, the manufacturer of the display device 120 may periodically send the unique ID and public key information of the devices it manufactures to the media distribution outlet 100 and they may be stored in the database 103 for future use. In embodiments in which the public key also functions as the unique identifier 126, only the public key may be provided to the distribution outlet 100 for future use. It may be desirable to restrict access to the manufacturing facility, so as to ensure that only "good" public keys (i.e., keys from actually-manufactured display devices, not just fake key sets generated maliciously) are delivered to the media distribution outlet 100. It should be noted that, although the foregoing example has been described with respect to one media distribution outlet 100, there may in fact be numerous media distribution outlets capable of interacting with display devices 120. Therefore, the display device 120 manufacturer may send this information to all or a subset of known outlets, or, for example, to a centralized database which may be accessible by all or a subset of known distribution outlets 100.

Figure 3:
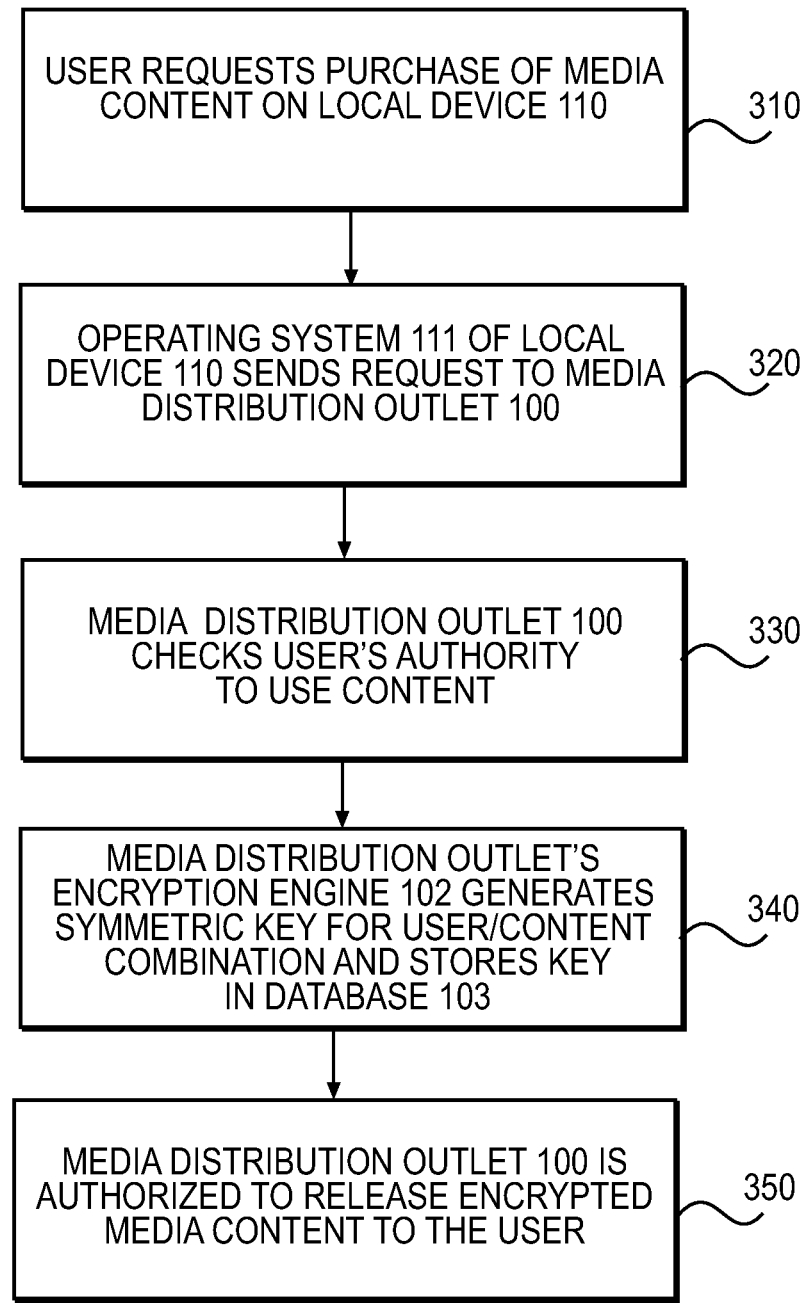

FIG. 3 shows an exemplary method by which a user may purchase media content using a local device 110. At step 310, a user may request the purchase of media content via the user interface 114. (This request may be explicit, or may implicitly result from a user request to download or playback media content.) The request may be generated within the operating system 111 or an application 112, and may include a unique user ID and a content ID. At step 320, the operating system 111 may send the request to the media distribution outlet 100 via the communications port 116. In certain embodiments, all communications with the media distribution outlet 100 may require user authentication (for example, by using a user ID/password combination), to be followed by use of an encrypted channel.

The media distribution outlet 100 may, at step 330, review the request and determine that the user is a registered user of the outlet 100 and that the user is authorized to view the content. For example, the outlet 100 may verify that the user has paid for the content (e.g., by using a credit card or by using an existing balance on the user account), or that the user is otherwise authorized to view the content (e.g., by presenting a promotional code or for some other reason). The outlet could also verify that the user has appropriate privileges to view the content, e.g., parental control privileges.

At step 340, the encryption engine 102 of the media distribution outlet 100 may generate one or more cryptographically-safe symmetric keys which may be stored in database 103 and associated with this user and this media content. For example, if database 103 is a relational database, this information can be stored as (user ID, content ID, symmetric key) rows.

At step 350, the media distribution outlet 100 may be able to release the media content to the user, but only if the content has been encrypted with the symmetric key(s) which can be found in database 103 for this user and this content. For example, the user might be allowed to download the encrypted media content to his local device 110. If multiple symmetric keys have been used to encrypt the content, all of those symmetric keys (and to the extent necessary, any information describing which keys apply to which portion of the content) can be stored in database 103. It will be noted that it is not a requirement of the system that a new key be generated for each user/content combination. However, the reuse of keys for different users and/or different content requested by the same user may reduce the overall system security (for example, by opening additional possibilities for differential cryptanalysis). Thus, it may be preferable to generate a new, unique key for each user/content combination.

As noted above, at step 350, the media content is encrypted with the user/content symmetric key before it is released to the user. In order to decrypt this media content, the user must have some way of acquiring the symmetric key or keys used to encrypt the content. One method according to the present disclosure solves this problem by requiring the user to associate his purchased content with a specific display device 120. Once the content is associated with the display device 120, the symmetric key can be securely transferred to the display device 120 using the methods described herein.

Figure 4:
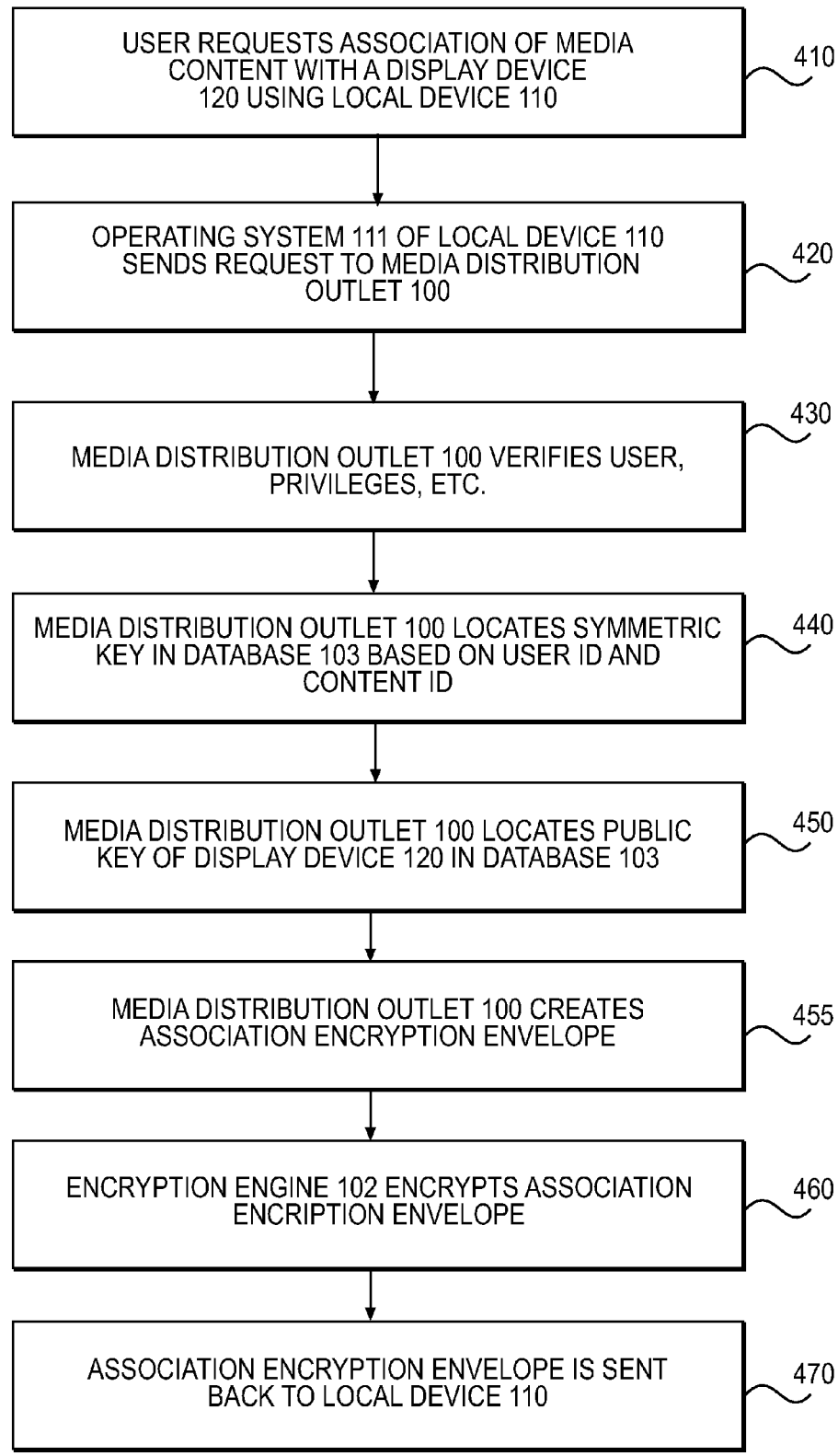

FIG. 4 shows one such method of associating purchased content with a specific display device 120. At step 410, the user may interact with his local device 110 (via the user interface 114) to request the association of purchased content with a specific display device 120. (This content may already have been downloaded to the local device 110, may be in the process of downloading to the local device 110, or may require downloading to the local device 110.) The display device 120 may send to the local device 110 its unique ID, or the local device 110 may already have this information stored in memory. At step 420, the operating system 111 may send an association request, comprising the unique ID 126 of the display device 120, the content ID and the user ID, to the media distribution outlet 100.

At step 430, the media distribution outlet 100 may receive the association request (generated at, e.g., step 420) and may check a) that the user is authorized to view the requested content (by, for example, detecting the presence of a symmetric key within database 103 for that specific user ID/content ID combination), b) that an allowed number of associated display devices 120 has not been exceeded, and/or c) that the display device 120 has been registered in database 103 (and hence has an associated public key). If the association request has also been signed by the display device 120, the media distribution outlet 100 may verify the signature on the request by using the device's public key. After the checks are performed the media distribution outlet 100 may add a new record in database 103 to indicate that the display device 120 has been associated with this user and content.

At step 440, the media distribution outlet 100 may take the symmetric key from database 103 for the specific user/content combination; at step 450 it may take the public key of the display device 120; and at step 455 it may create an "association encryption envelope." In one embodiment this association encryption envelope may contain only the symmetric key found in step 440, but in other embodiments and implementations it may additionally contain other information. In some embodiments, the "association encryption envelope" may also contain a hash value of the information in the envelope, which may be useful in performing data integrity checks. Further, this hash value may be a secure hash determined, for example, by the SHA-256 algorithm or other methods of determining a secure hash. At step 460, the encryption engine 102 may encrypt the association encryption envelope with the public key of the display device 120, and at step 470 may send the association encryption envelope back to the operating system 111 of the local device 110.

It will be understood that in some embodiments the processes of purchase and association can be initiated by a single action of the user (for example, "purchase and play" action or equivalent). In this case, the operating system 111 can initiate processes of purchase (e.g., FIG. 3) and association (e.g., FIG. 4) automatically, one immediately after the other, without user intervention. In some cases, such requests can be even combined together to avoid unnecessary round-trip times.

Figure 5:
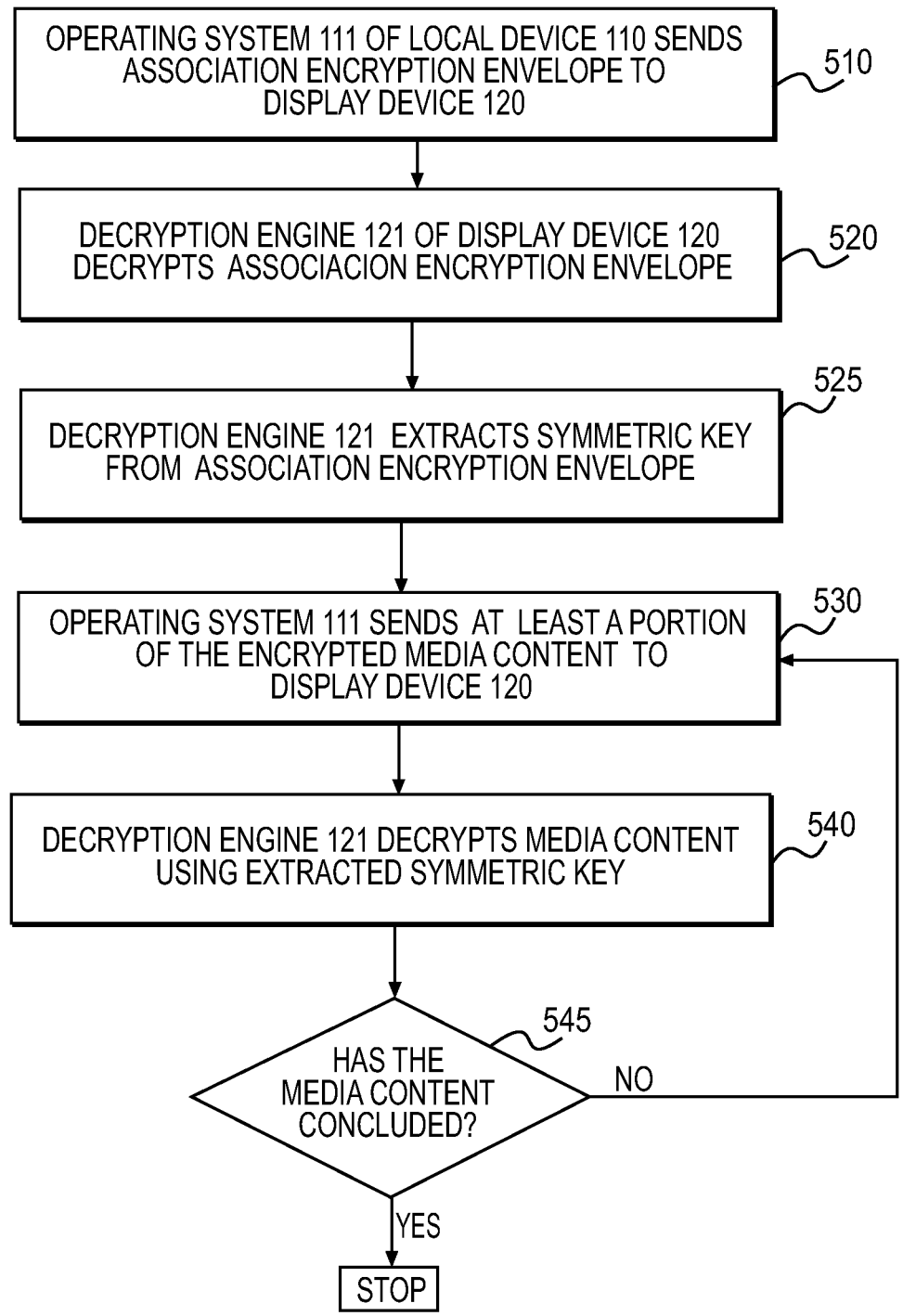

FIG. 5 shows an exemplary process for the playback of content purchased by the user (e.g., in accordance with the purchase process described with respect to FIG. 3), on a display device 120 which has been associated with the user and the content, e.g., in accordance with the association process described with respect to FIG. 4. Thus, it is assumed for the purpose of describing FIG. 5 that, before playback, the display device 120 has already received an association encryption envelope, encrypted using the public key corresponding to private key 127, and that this association encryption envelope contains at least a symmetric key which can be used to decrypt the purchased content.

At step 510, the operating system 111 may send the received association encryption envelope (still encrypted by the public key of the display device 120) to the display device 120. At step 520, the decryption engine 121 of the display device 120 may decrypt the association encryption envelope using the device's private key 127, and then at step 525 may extract the unencrypted symmetric key from the decrypted association encryption envelope. In some embodiments, the display device 120 may also calculate the hash value of the information contained in the envelope and verify that this value is the same as the hash value stored in the envelope at the time the envelope was created. If the two values are not the same, this may indicate that the information stored in the envelope is corrupted.

At step 530, the operating system 111 may begin transmitting at least a portion of the purchased content (such content still in an encrypted form, encrypted using the user/content-specific symmetric key) to the display device 120. As the display device 120 receives encrypted content, at step 540 its decryption engine 121 may decrypt the content using the user/content symmetric key obtained at step 525. Then, the decrypted content may be decoded by decoder 122 and shown on screen 123. If, at step 545, there is still media content remaining (e.g., the entire movie has not been transmitted to the device 120), the method may return to step 530 to continue transmitting, decrypting and displaying content. If not, the method may stop.

To strengthen security throughout the entire process, the display device 120 itself preferably should have no capability to release unencrypted content in any form (except for showing it on screen 123). For example, allowing a TV set to have unencrypted HDMI output from an encrypted stream may weaken the security of the systems and methods provided herein. It should be recognized, however, that in some implementations such an unencrypted output may be included in the display device for business considerations rather than technical or security considerations.

We note that the specific uses of symmetric and asymmetric encryption in the systems and methods described herein are but one possible embodiment. Depending on the overall system constraints and capabilities of the various apparatuses, it may be possible to substitute symmetric encryption for asymmetric encryption and vice versa. For example, the display device 120 might have its own secret symmetric key, rather than a public/private key pair. In this case, the database 103 of the media distribution outlet 100 would need to store the secret symmetric keys of display devices 120. While such an embodiment is within the scope of the present disclosure, care should be taken to ensure that the display device symmetric keys stored in the database 103 are not compromised, either while they are being transmitted to the database 103 or while stored in the database 103.

Similarly, rather than encrypting media content with a symmetric key assigned to each user/content pair, media content could be encrypted with a public key associated with that user/content pair. Which specific combination of symmetric key or public/private key cryptography to use to implement a system according to the present disclosure is a matter of implementation choice governed by issues, such as, processing power available to perform encryption/decryption and the importance of speed in accomplishing encryption/decryption.

It should also be noted that whenever encryption of some content with an asymmetric key (i.e., a public or private) key is mentioned within the present description, it can be either implemented as direct encryption with the asymmetric key, or, alternatively, by generating a temporary crypto-safe symmetric key, encrypting content with this temporary symmetric key, and encrypting the temporary symmetric key with an asymmetric key. Then, the encrypted content will include both content encrypted with the temporary symmetric key, as well as the temporary symmetric key encrypted with the asymmetric key. This is a standard technique in cryptography used for optimization purposes, when, for example, it may not be desirable to encrypt large amounts of data using asymmetric encryption because of limited system resources (it being understood that asymmetric encryption is generally slower and more resource-intensive than symmetric encryption).

The foregoing description has focused generally on the process of securely transmitting any type of digital media content from a media distribution outlet to a display device. Specific, optional methods are now described relating to particular forms of media content.

For example, traditionally, video containers are divided into two logical parts: one part is container information, such as indexing, timing and positioning information, and another part is video stream information (usually in the form of I-frames, P-frames and B-frames). In one embodiment according to the present disclosure, it may be desirable only to encrypt video stream information (i.e., the I-frames, P-frames and B-frames), and optionally to encrypt the audio stream, but not to encrypt the basic container information, such as indexing, timing and positioning information. This will allow a software player running under the operating system 111 to navigate the media content (such as flow control, seek, fast-forward, etc.) while preventing duplication of the actual video content.

Taking an MP4 container as an exemplary embodiment, such selective encryption and decryption of an MP4 container may be achieved in the following way. Each MP4 container is made of a number of discrete units called "boxes" or "atoms." Each atom is characterized by its length and name, and can be either a parent atom containing child atoms, or can contain some data. Raw information, such as video and audio stream data, is usually stored in the atom named 'mdat', usually placed at the end of the MP4 container. The 'mdat' atom data is made up of pieces called 'chunks', each of which contains data for a particular stream. Usually chunks of different streams are interleaved so that chunks of different streams, for instance, video and audio, which should be played at a particular time, are located relatively close to each other within the MP4 container. Chunks are usually separately referenced in the indirect child atoms of atom 'moov' to provide means for seeking within the file. For each stream there is a separate set of such atoms. For example, atom 'stco' usually contains offsets of chunks of a particular stream from the beginning of a file; atom 'stsz' usually contains sizes of stream chunks in bytes; atom 'stsc' usually provides information about a number of frames per chunk for a given stream; atom 'stss' usually contains information about certain key frames (I-frames) and their position in time from the beginning of a stream; and atom 'stts' usually contains information about the time during which each frame should be displayed.

As will be discussed in further detail below with respect to FIG. 6C, in one embodiment according to the present disclosure, media distribution outlet 100 may take an existing MP4 container and create a new partially-encrypted container, in which chunks within the 'mdat' MP4 atom are encrypted, but information and data in the other atoms (which constitute the "header" of the file) remain unencrypted. This lets the operating system 111 (or any application 112 running under the operating system 111)—without either having decryption capability—to open the container and navigate to a particular chunk corresponding to a particular time, or to perform other similar operations. As soon as the appropriate chunk has been determined according to the information in the MP4 file header, the encrypted chunk data may be passed to the decryption engine 121 of the display device 120 for decryption and further processing (e.g., the actual decoding of the video stream and subsequent display on the screen 123).

In some cases, following encryption, the size of a chunk will be larger than it was before encryption. This may happen, for example, when using block ciphers, because of the block nature of the encryption method and/or because of the use of an initialization vector with respect to one or more chunks before encryption. In such cases, the chunks following this encrypted chunk (in the file, not necessarily in time) will be shifted by a correspondent distance toward the end of the file. Accordingly, the value of the offsets of the moved chunks stored in 'stco' atoms of correspondent streams should be recalculated respectively. Also, the sizes of the encrypted chunks stored in the 'stsz' atom of the video stream may require updating. As a result, a new container may be built, similar in structure to an ordinary MP4 container, except that the video stream data is encrypted. It should be noted that while building the new container there is no need to perform re-encoding (from/to H.264 or similar) of the video stream.

It should also be noted that if such an MP4 container (with an encrypted video stream) is constructed as described, playback can still be performed from the same locations from which it was possible to do so with the original (non-encrypted) container, as all indexing information (after the proper recalculations) remains valid. However, it should be noted that if a chunk has more than one frame, and the I-frame is not the first frame in the chunk, it may be necessary to decrypt the whole chunk in order to find the starting position of the frame within the chunk. (In standard MP4 containers only offsets of chunks are usually available in atoms of the file header.) This problem may be avoided, if, for example, encoding is performed such that I-frames are always at the beginning of a chunk.

To maximize the functionality of navigating to any point in the video stream without first requiring that the whole video stream data be decrypted, encryption should be performed in a manner that allows playback from a variety of locations within the file, not just from the beginning of the file. For example, to facilitate all of the same functions which are available in an unencrypted MP4 container in a partially-encrypted MP4 container (for example, as described herein), decryption may be started not only from the beginning of the video stream (which would be the result of a native implementation for video stream encryption), but also from any of the chunks related to this stream referenced in the 'stss' atom of the MP4 container (termed herein as 'indexed chunks').

Figure 6A:
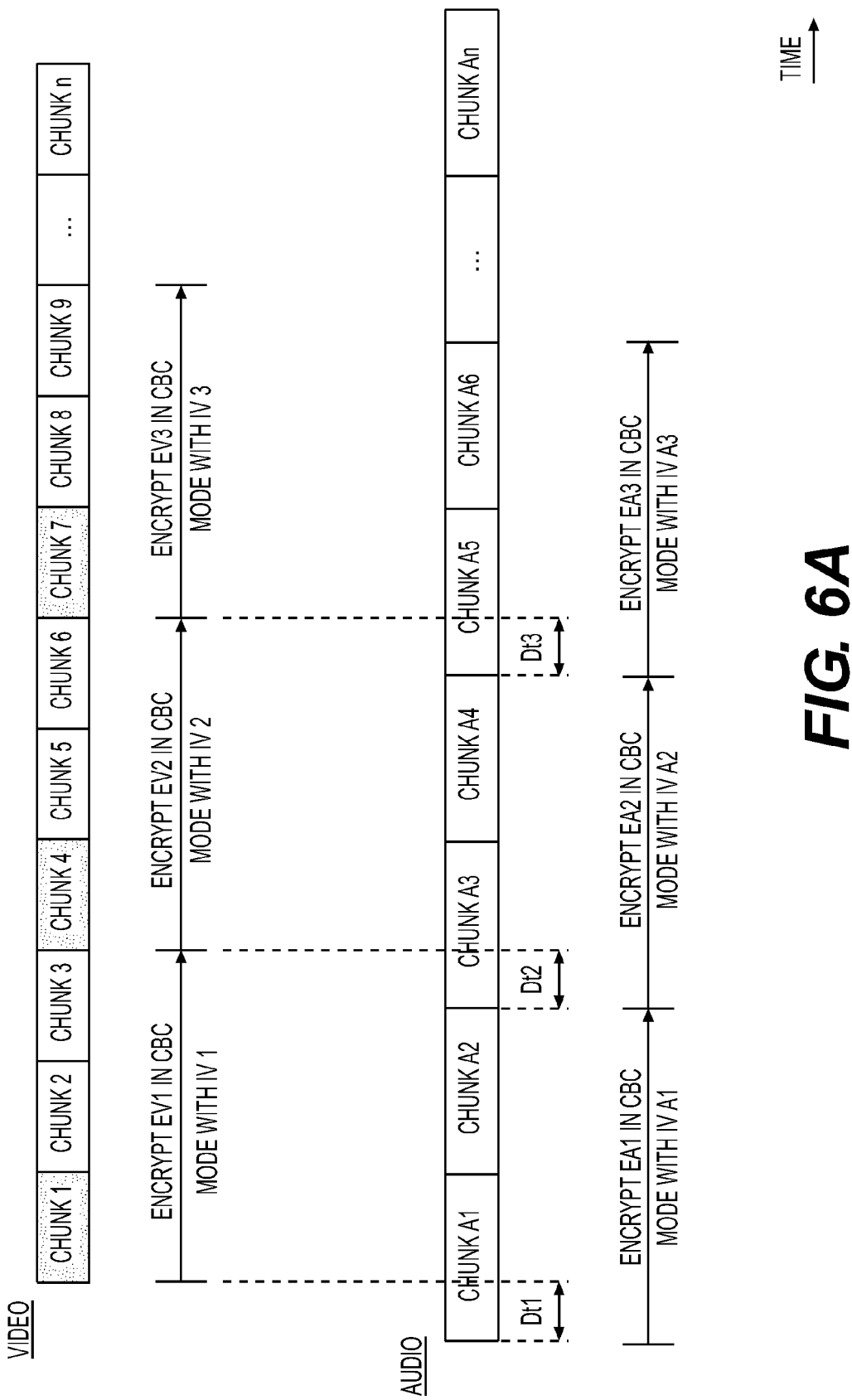
FIGS. 6A-6B show exemplary methods of encrypting video and audio data according to the present disclosure.

To accomplish this, in some embodiments, as shown with respect to FIG. 6A and described in additional detail below, encryption may be performed in the cipher block chaining (CBC) mode of AES with a new initialization vector for each "section" of the video stream, with each such section starting from an indexed chunk (which usually, though not necessarily, starts with an I-frame) and covering the video stream up to (but not including) the beginning of the next indexed chunk.

Initialization vectors need not be secret or have a guaranteed level of randomness. However, it is sometimes preferable to have "better" initialization vectors to improve security in certain scenarios. Thus, in one such embodiment, initialization vectors for each such section of video stream may be generated randomly (e.g., by using cryptographically-safe random numbers) and may be stored either in an unencrypted portion of the container (for example, as an additional atom in MP4 header), or in the beginning of each such indexed chunk.

In another embodiment, initialization vectors may be derived from a hash function (such as SHA-1) of the concatenation of the current frame number (of the indexed chunk within the stream), its position in the container (in bytes), and/or time position of its first frame in the container (in mks), it being understood that if one or more of these parameters is unavailable for any reason, it could be omitted as long as at least one parameter is present.

However, in cases in which content is being streamed, none of these parameters may be available. In those cases, it may be preferable to use a hash of selected parameters of the previous chunk (or, preferably, the whole previous chunk) as an initialization vector for the next chunk. What constitutes the "previous chunk" can be defined in many ways including, by way of example, "previous chunk of the same type," "previous chunk regardless of type," and "previous decrypted chunk" in the case that the previous chunk was encrypted.

In one embodiment, when the system comes to the point in the process at which it is appropriate to begin sending encrypted video content, e.g., step 530 as shown on FIG. 5, the encryption engine 121 may begin (symmetrically) encrypting the video content in CBC mode. As shown on FIG. 6A, for example, chunks 1, 4 and 7 may be "indexed chunks" (shown as partially shaded). Thus, chunks 1 through 3, i.e., the last chunk before the next indexed chunk, are treated as one segment (and may use a first initialization vector) for the purposes of encrypting in CBC mode. Chunks 4 through 6 can then be encrypted, again in CBC mode, using a second initialization vector. The process may continue in this fashion until the end of the video stream has been reached.

The foregoing discussion has been with respect to video stream data. It may be desirable to also encrypt audio stream data. Audio stream data may also be stored in chunks, but those chunks may not always be synchronized with the video stream. Thus, as shown on FIG. 6A, the beginning of an audio chunk (in time, not location within the file) may not necessarily correspond to the beginning of a video chunk. In one embodiment, like video data, audio stream data may be encrypted in CBC mode. In this embodiment, an audio stream may be encrypted in "segments" starting from the nearest chunk (taken based on time, not on position within the MP4 container) immediately preceding (or exactly coinciding) with the indexed video chunk. If audio chunks are not aligned with video chunks, this approach may require decrypting and decoding up to almost one entire audio chunk (even though this audio data may not actually be used after decoding).

For example, when the user wants to jump to the first indexed chunk of the video stream (in the example shown in FIG. 6A, chunk 1) the system will need to decrypt and decode all of chunk A1—even though part of the data is, in time, prior to the relevant part of the indexed chunk. The system may then discard the portion of the audio stream occurring during time interval DT1.

Figure 6B:
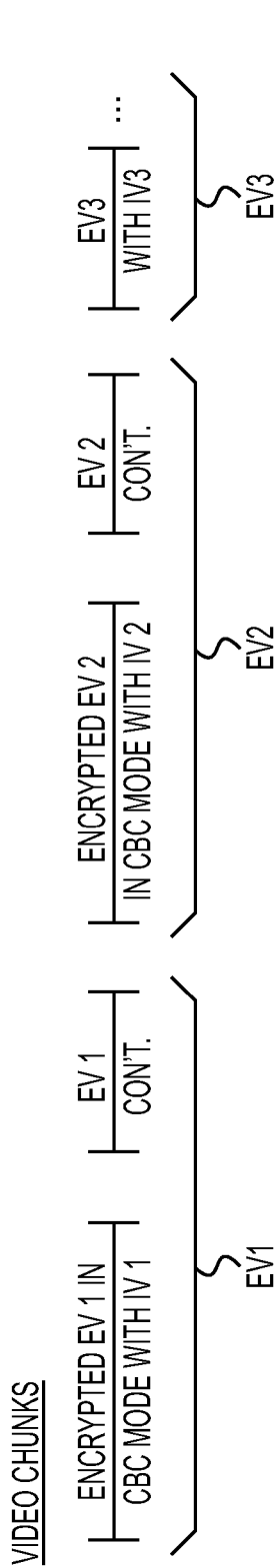
Figure 6B:
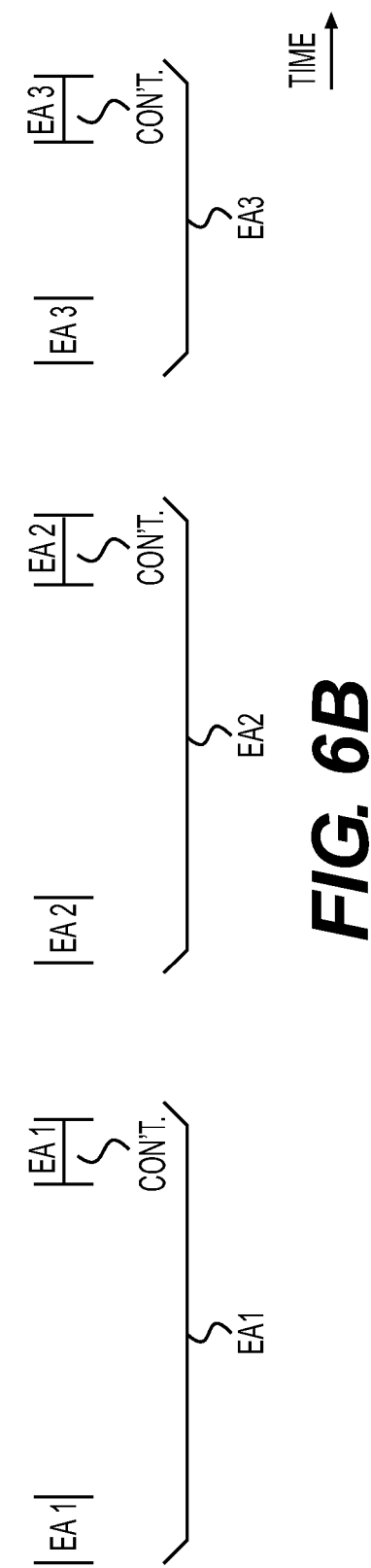

In certain embodiments, it may be desirable to interleave the encrypted audio streams and video streams into a single file or stream. FIG. 6B shows one example by which the video and audio chunks shown on FIG. 6A may be interleaved into a single stream, with encryption sections for video (EV1, EV2, EV3) being interrupted and/or interleaved with encryption sections for audio (EA1, EA2, EA3).

It should be noted that modes other than CBC and encryption methods other than AES may also be used for the purposes discussed above. Additionally, different layouts may also be used. For example, each chunk (instead of just each indexed chunk) may be processed as a separate segment with its own initialization vector.

It may also be desirable, in certain embodiments, to encrypt only a portion of the video and/or audio data. For example, a distributor may want to leave the first 15 minutes of content unencrypted, while keeping the rest encrypted. In another implementation, it might be desirable to encrypt only audio, or only video. In other implementations, it may be desirable to encrypt, for example, subtitles as well as video and/or audio data. It will be understood that, if the subtitles are encrypted, the display device 120 may need additional hardware and/or software allowing it to render the subtitles.

It should be noted that while the foregoing discussion was with respect to MP4 containers, many other container formats, such as ASF or Matroska, support the separation of information such as meta data from audio/video stream data; the division of stream data into chunks; the indexing of chunks for navigational purposes; and the like.

Figure 6C:
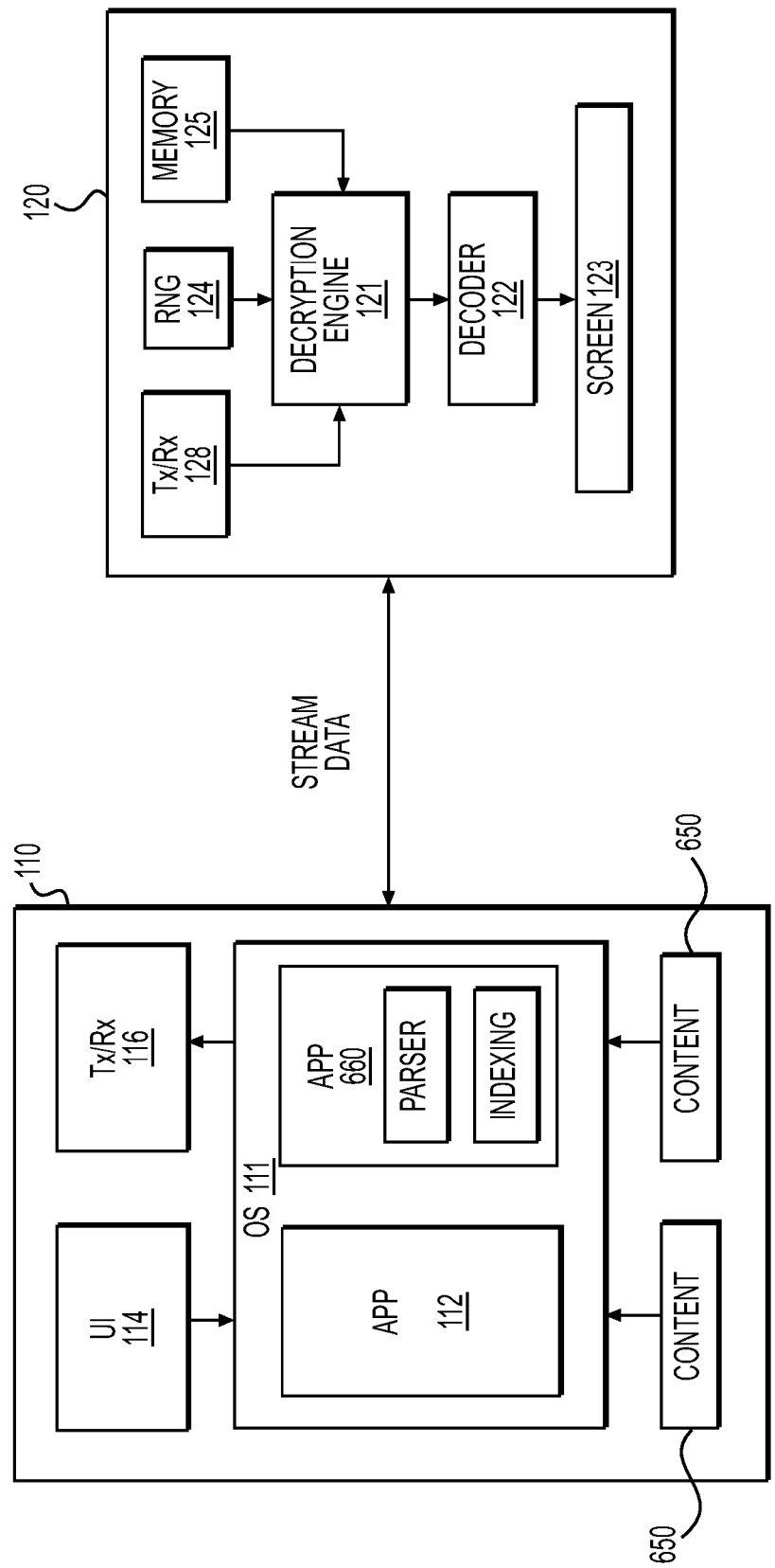
FIGS. 6C-6D are block diagrams of exemplary systems according to the present disclosure.

FIG. 6C is a block diagram of one implementation of a local device 110 in which the operating system 111 could playback purchased, encrypted content. In this embodiment, the operating system 111 may receive media content in a partially-encrypted container format (such as a partially-encrypted MP4 container) 650 having the video and/or frame data encrypted as described above. The operating system 111 may include a software player application 660 which works with the content container 650, or in an alternative embodiment, the application 660 may be a stand-alone application which runs on the operating system 111 instead of being incorporated into it. In either case, the application 660 may handle the parsing, indexing, user interface 114 control and all other player functions except for the actual playback of video/audio stream data (it being understood that this video/audio stream data has been encrypted as described herein and will be sent to the display device 120 in an encrypted form). This will allow the software player 660 to provide all usual navigation services (seek, fast forward, etc.) to the end user, while keeping the display device 120 relatively simple, i.e., keeping all of the logic within the application 660 such that the display device 120 is not required to provide complicated and varying player capabilities and logic. Then, the encrypted video/audio stream data (extracted from the container by the software player 660) may be transferred from the local device 110 to the display device 120. For example, if the content container 650 is an MP4 container comprising an H.264 AVC video stream and an MP3 audio stream, only the encrypted H.264 AVC and MP3 data need be transferred to the display device 120.

For example, an end user might navigate, using the software player 660, to a certain point within the video. The application player 660 will have access to unencrypted information about which video and audio chunks are necessary to playback the content from that location. All the application 660 needs to do is to extract this information (in the same way that existing software players extract this information from unencrypted containers), and then begin extracting the appropriate chunks (which are encrypted) and send them to the display device 120. Assuming that the display device 120 has already received the associated symmetric key, the display device 120 may decrypt and process the encrypted data as described herein.

In another example, when an application player 660 needs to respond to a user request for "fast-forwarding," the application 660 will need to start extracting appropriate chunks (again, in exactly the same manner as with unencrypted streams) at a "faster than normal" rate and then feed these chunks to the display device 120.

It will be noted that, in the embodiments described, no decryption takes place within the software player 660 or the operating system 111. Furthermore, no keys are stored within the software player 660 or the operating system 111. This eliminates the possibility of extracting keys from or by compromising the software player 660 or the operating system 111. It should also be noted that the "content container" 650 does not necessarily need to be stored (as a file or similar) on the local device 110; it could be streamed from the media distribution outlet 100 and parsed as it arrives (potentially with some buffering within operating system 111).

Figure 6D:
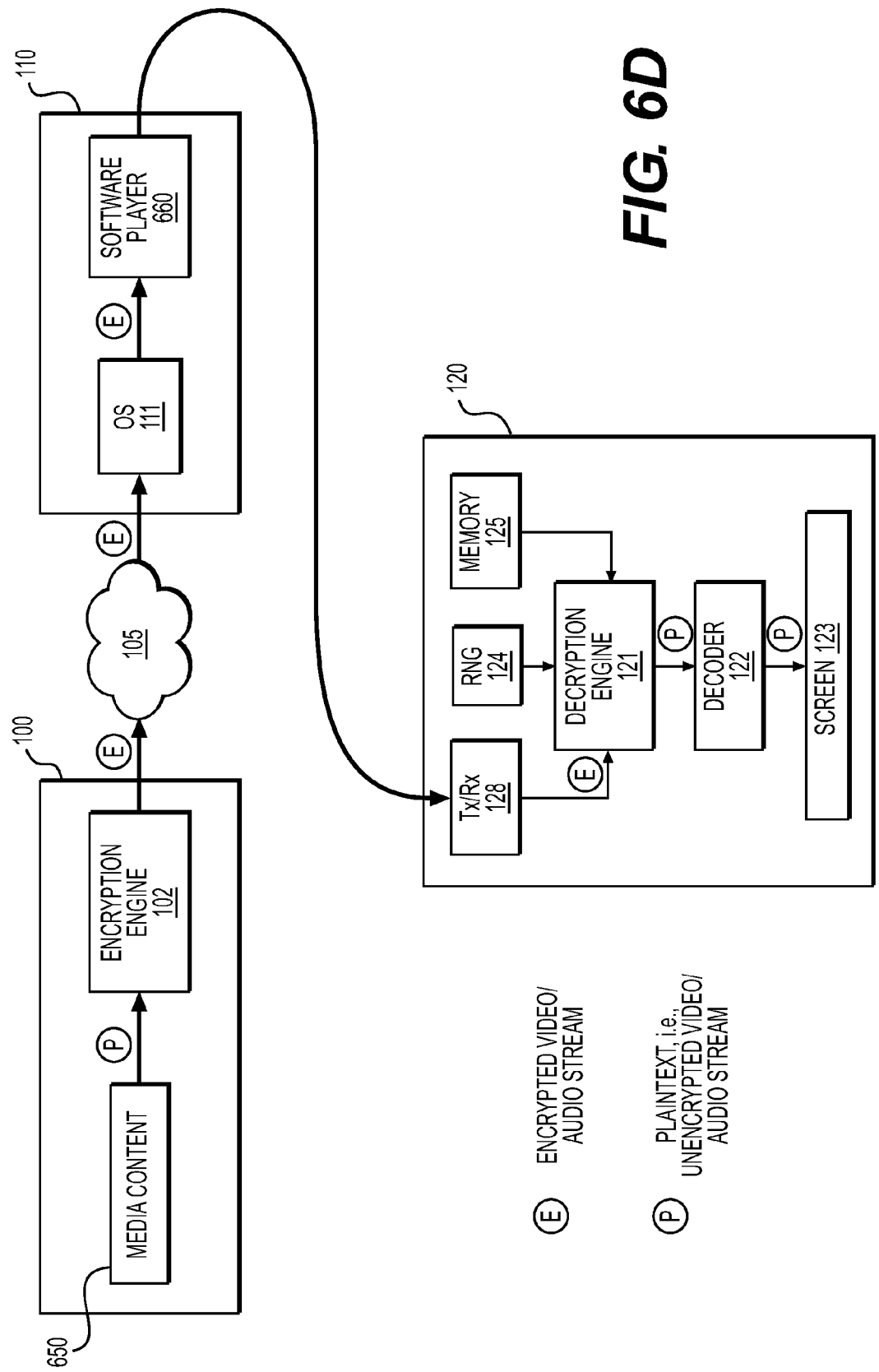

To summarize an exemplary embodiment as described above, a typical data flow is shown on FIG. 6D. First, information from a source video, i.e., the media content 650, may be transmitted from storage 101 to the encryption engine 102 of the media distribution outlet 100 and encrypted using a symmetric key. Then, the encrypted media content 650 may be transmitted, via the Internet 105, to the operating system 111 of the local device 110. From the operating system 111, the encrypted content 650 may be passed to software player 660, and then to the decryption engine 121, decoder 122, and screen 123 of the display device 120. The encrypted content is not decrypted until it actually reaches the display device 120. Thus, both the operating system 111 and the software player 660 operate at the stage where the video stream is still encrypted, and security issues can be ignored within both the operating system 111 and the software player 660. This, in turn, allows for open and/or third-party development of and/or upgrades to the operating system 111 and/or the software player 660 without introducing risks to the media content.

In an alternative embodiment, instead of transmitting media content via the Internet 105, the media distribution outlet 100 may distribute media content that is stored on physical data storage units (e.g., stored on flash cards and mailed to the user). In such an embodiment, each physical data storage unit may have its own unique ID, and the media content on the physical storage unit may be encrypted with a symmetric key unique to that unit. Information relating to each such unit (e.g., the unit's ID and the symmetric key used to encrypt the media content) may be stored in the database 103. When it is time to associate the media content with a particular display device 120, the user can transmit the unit's ID along with the display device ID to the media distribution outlet 100, and then use procedures similar to that described at steps 440-470 with respect to FIG. 4 to obtain the association encryption envelope.

An optional embodiment of the present disclosure may use "z-ordering" to display media content on a display device 120 as, for example, described in U.S. patent application Ser. No. 13/323,163, filed on Dec. 12, 2011, and entitled "Systems and Methods for Transmitting Visual Content," the entirety of which is hereby incorporated by reference. This embodiment would allow a software player 660 to overlay subtitles and/or menus over a video stream while at the same time protecting against unauthorized access to the encrypted video stream within the operating system 111 of the local device 110.

Figure 7:
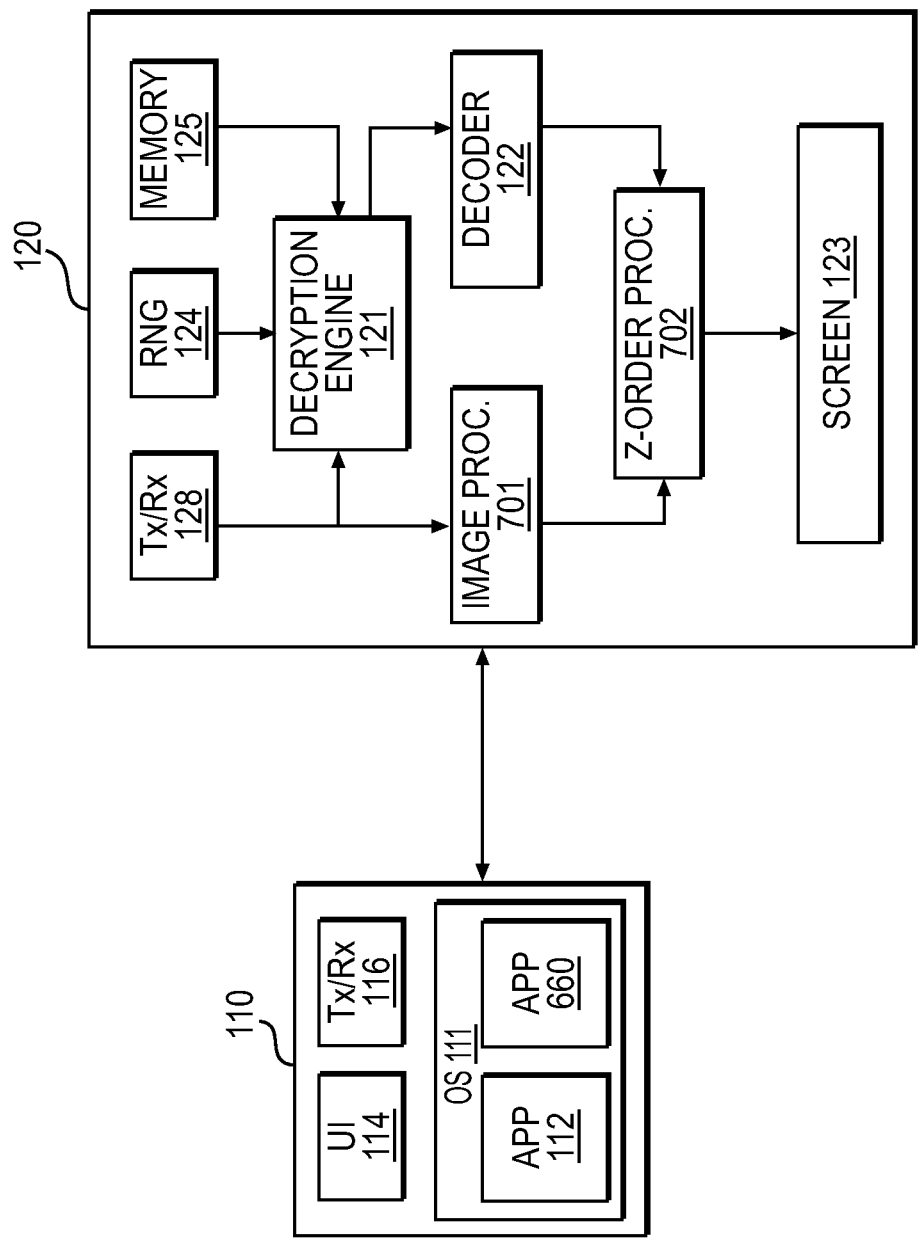
FIG. 7 is a block diagram of an exemplary system according to the present disclosure implementing a z-ordering technique of displaying media content on a display device.

One exemplary application of this z-ordering concept to the present disclosure is discussed with reference to FIG. 7. In such an embodiment, the display device 120 may additionally include an image processor 701 and a z-order processor 702 in order to display a still image (which may be fully transparent, semi-transparent or fully opaque) over the video stream. In one embodiment, the still image may be the same size as the screen 123 of the display device 120 (i.e., have the same number of pixels as are present on the screen 123 of the display device 120).

At the time of playback, the software player 660 may transmit to the display device 120 an encrypted video stream and an unencrypted (but possibly compressed/encoded) still image. The encrypted video stream may be processed as previously discussed (i.e., decrypted by the decryption engine 121 and decoded by the video stream decoder 122) and then forwarded to the z-order processor 702. The still image may be received by the image processor 701, where it may be decoded (e.g., decompressed from PNG) and then forwarded to the z-order processor 702. The z-order processor 702 may combine the video stream with the still image (with still image over the video) and may forward the combination of the two to the screen 123 to be displayed.

It can be appreciated that it is possible to display subtitle and/or menu information over the video stream by controlling the transparency of the image, as well as the z-order of the image and the video stream. For example, when it is desired that only the video stream be displayed, the still image that is sent from the software player 660 to the display device 120 may be a fully transparent image. Thus, when combined with the video stream in the z-order processor 702, the video stream is displayed as normal. Alternatively, a "no still image" flag or similar indication may be transmitted to the display device when only the video stream is to be displayed.

When a subtitle is to be displayed, the software player 660 may change the still image that is sent to the display device 120 to a semi-transparent image (for example, a PNG image) in which the subtitle text is included in the image at the position where the subtitle is to be displayed on the screen 123 of the display device 120. After the image is processed by the image processor 701, the z-order processor 702 may combine the semi-transparent image and the video stream (which has already been decrypted and decoded) to display the subtitle over the video stream. When the text on the subtitles needs to change, the software player 660 can transmit a new or updated still image to the display device 120. When no more subtitles should be displayed, the software player 660 may again send a fully transparent image to the display device 120, which effectively results in the video stream alone being displayed again.

Similarly, when a menu is to be displayed, the still image that is transmitted by the software player 660 may be partially opaque—which, after it is processed by the image processor 701 and combined with the video stream by the z-order processor 702, may result in a menu being displayed on the screen of the display device 120.

In yet another embodiment, one or more 3D video formats may be supported. In certain 3D video formats, the movie is organized as two video streams (one for each human eye). The two streams may be combined to render a 3D stream. In this case, it might be advantageous to have two separate decryptors and two decoders to have raw video data ready in time (though in some embodiments one decoder may need access to the current decoding data of another decoder). The media distribution outlet 100, in some embodiments, could encrypt each of the two streams with different symmetric keys. In this way, 2D versions could be provided by simply transmitting to the display device 120 one key, while 3D versions could be provided by transmitting both symmetric keys to the display device 120.

One additional optional feature according to the present disclosure is to provide a (preferably invisible) digital watermark at the point when data is encrypted for the user (see, e.g., step 350 on FIG. 3). Then, if an illegally leaked copy is released to the public, the watermark can be used, for example, to identify (via database 103) which display devices 120 have had access to the content with the leaked watermark, and to mark these devices 120 as compromised in database 103, preventing further association of any content to these (likely physically hacked) devices. This, in turn, may prevent further unauthorized copying.

Still another optional feature according to the present disclosure is to have the decoder 122 coupled directly to the communications port 128 (as well as to the decryption engine 121). In other words, the communications port 128 would be capable of transmitting data/information to the decoder 122 without that data/information first having to pass through the decryption engine 121. In this manner, unencrypted content transmitted by the local device 110 to the display device 120 can be played-back by the decoder 122. It will be understood that this feature is optional and unrelated to maintaining the security of the encrypted media content, but designed merely to allow the offload of computationally-intensive (but otherwise unencrypted) media content decoding from the local device 110 (which may be resource-constrained) to the specialized (and potentially more efficient) hardware of decoder 122. To ensure the security of encrypted media content, however, the transmission path between the communications port 128 and the decoder 122 should be one way only—from the communications port to the decoder and not the other way around. This way, the decoder 122 will not be able to transmit decrypted media content to the communications port 128.

Figure 8:
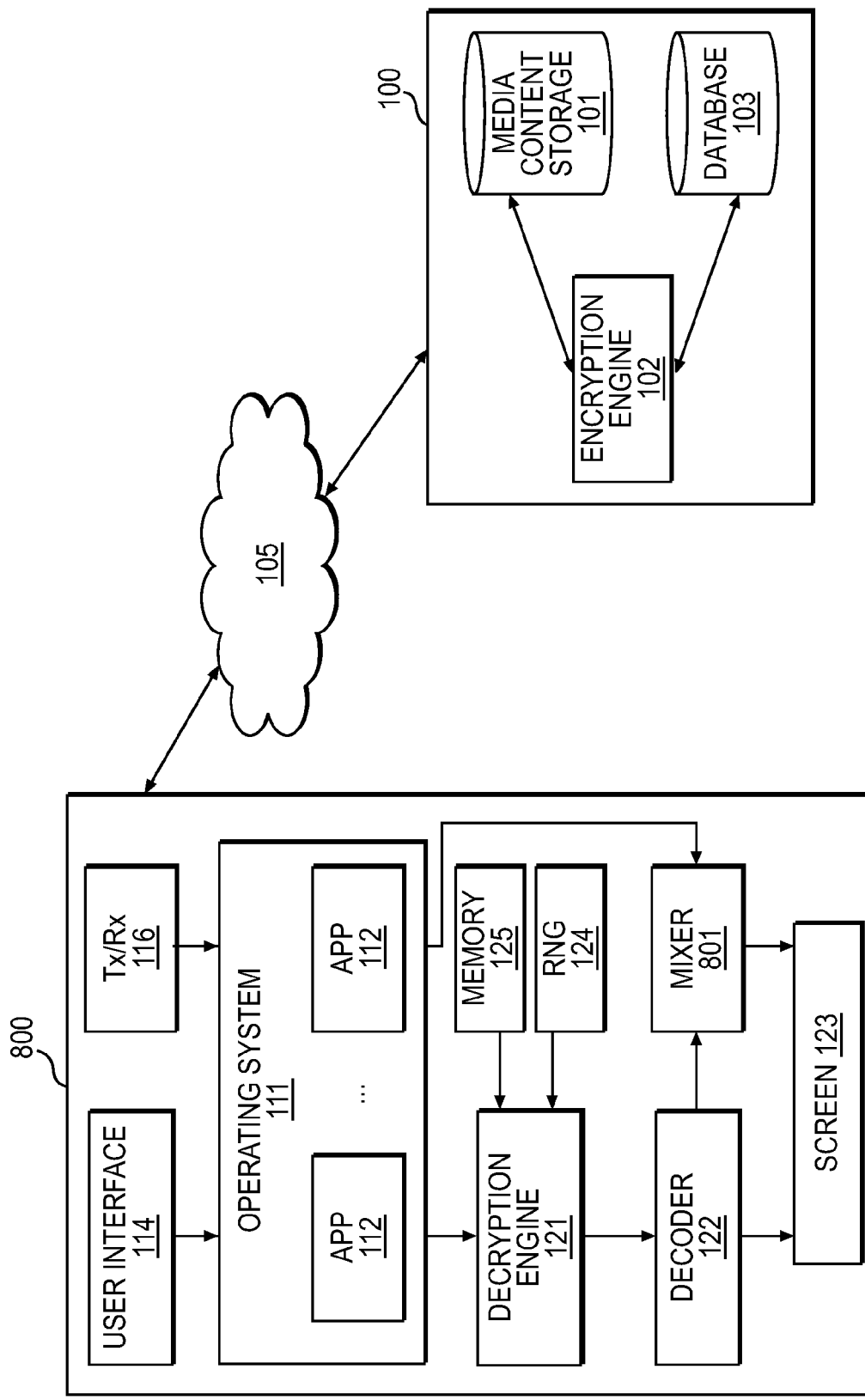
FIGS. 8-10 are block diagrams of exemplary systems according to the present disclosure.

FIG. 8 shows yet another embodiment according to the present disclosure for systems in which the local device 110 and the display device 120 are packaged together (designated here as 800), such as, for example, in the case of a laptop, desktop computer, or a television set that has an operating system, storage, internet access, etc. To thwart operating system-based attacks on the security of the purchased content, decryption should not occur within the operating system 111 of the combined device 800. Rather, the combined device 800 should include a decryption engine 121, decoder 122, and private key 127 storage that are implemented in hardware. For example, a secure crypto processor may be used to implement these functions. If instead implemented in software, or a combination of software and hardware, the implementation should include equivalent separation/security guarantees as if it were implemented exclusively in hardware (for example, by using virtualization techniques).

To support situations in which the playback of the encrypted content does not occupy the whole screen 123, a mixer 801 may be provided. This mixer 801 allows the appropriate area of screen 123 to be occupied by the playback of the encrypted content (after appropriate decryption and decoding, of course), while the rest of the screen 123 remains under direct control of the operating system 111. In addition, to ensure security of the encrypted media content, the operating system 111 should not have the ability to read data from the portion of the screen 123 which is currently displaying video that was originally encrypted. For example, typically, the operating system 111 is able to read from the screen buffer which corresponds to the screen 123. In this embodiment, the operating system 111 should not be able to read from the screen buffer which corresponds to the screen 123, but still may be able to read from the screen buffer which corresponds to the data sent from the operating system 111 to the mixer 801. It should be noted that in some embodiments, if both the mixer 801 and the Z-order processor 702 are present, they can be implemented as a single module. It should also be noted that in some embodiments the mixer 801 may be able to perform image scaling to enable a particular image to fit the intended area.

One potential application of the embodiment shown on FIG. 8 (or other similar embodiments) may be to display a webpage including some protected video on the screen 123 of the display device 120. In this case, all the HTML content of the webpage could be rendered by an application running under operating system 111, the unencrypted portion of stream or container could be handled by a software application 112 running under operating system 111, the encrypted portion of stream or container could be handled by the decryption engine 121 and the decoder 122 (as described in detail above), and then it all could be mixed by mixer 801 to produce the final (potentially dynamic) image.

Figure 9:
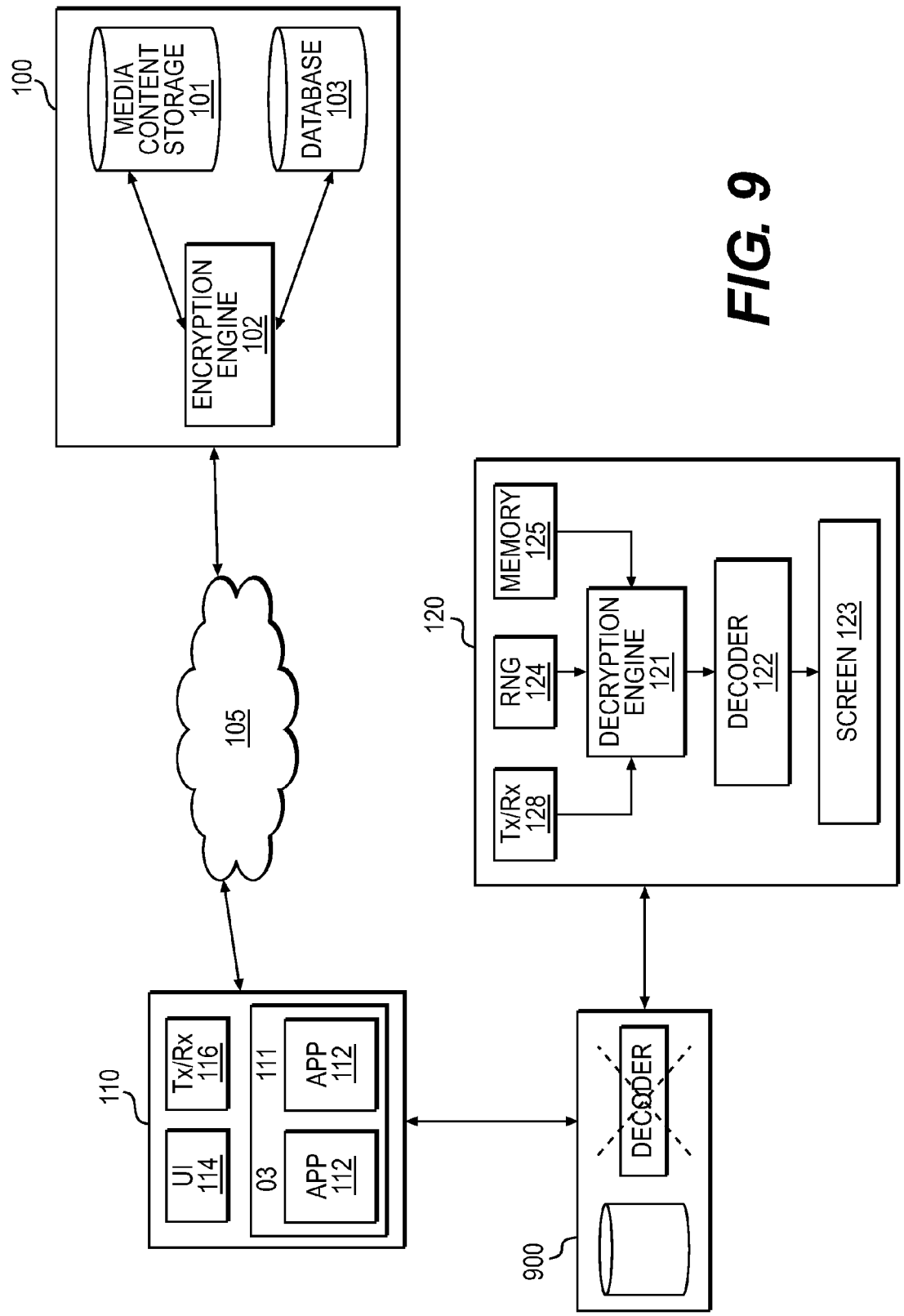

FIG. 9 shows yet another embodiment of a system according to the present disclosure. In such a system, a separate device 900, such as a set-top box, or some other intermediary device (e.g., a Tivo® or AppleTV® device), may be connected to the display device 120 (via a cable or wirelessly). This device 900 may be, for example, used as storage and controlled by the local device 110. While the device 900 may include a decoder and be capable of decoding video streams, as, for example, many set-top boxes are, a system according to the present disclosure could "override" or bypass this decoder (shown in FIG. 9 by crossing-out the decoder in the device 900 with the dashed lines) in order to preserve the security of certain digital content. Then, decryption and decoding of protected content could be performed, as described herein, on the display apparatus 120.

Figure 10:
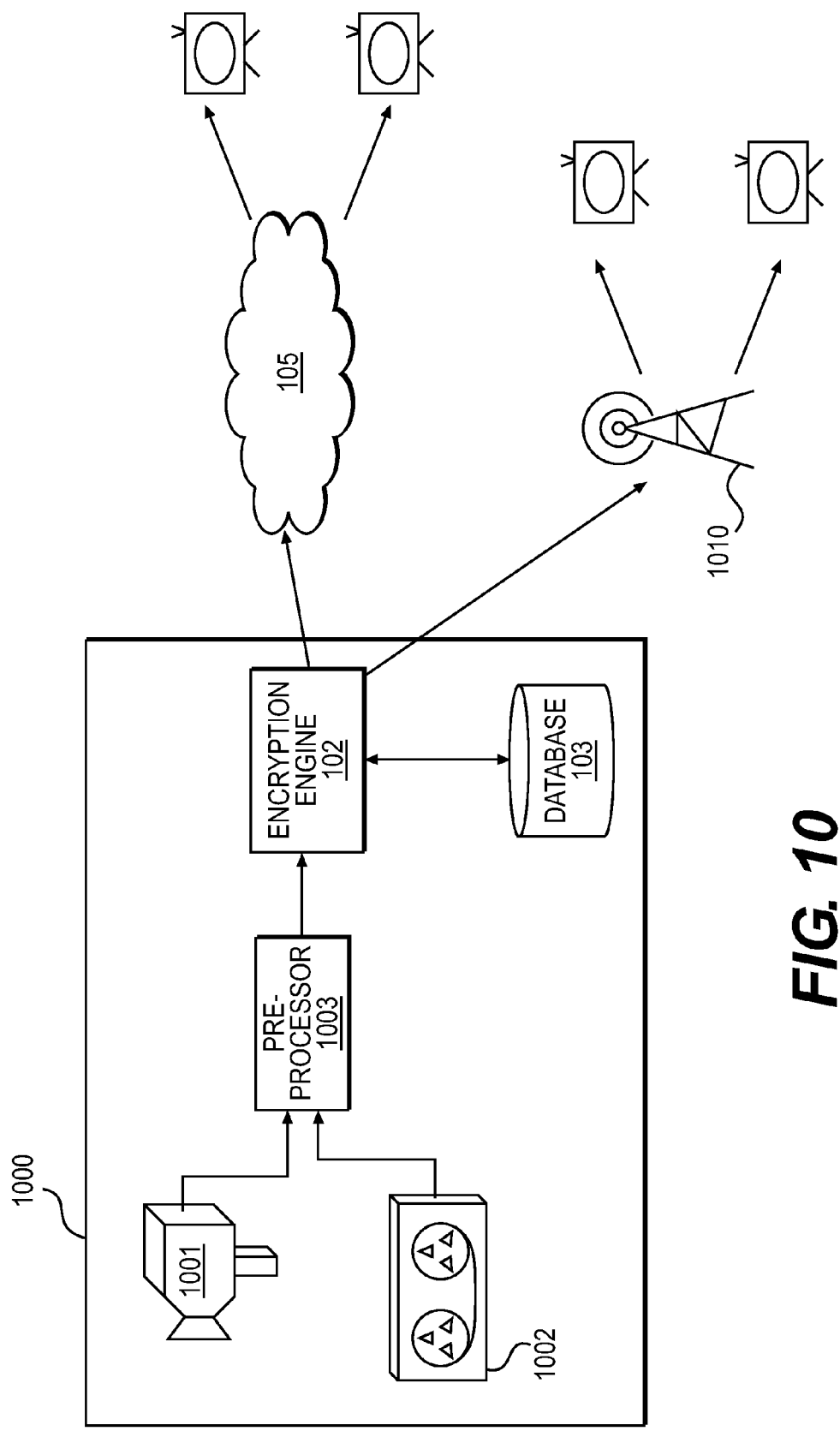

FIG. 10 shows yet another embodiment according to the present disclosure for securing broadcast media content, such as digital TV feeds. The media distribution outlet 100 may be, for example a digital TV broadcast station 1000. A signal, coming either from a camera 1001 or a pre-recorded data source 1002, may be (optionally) preprocessed and/or mixed in "preprocessor" 1003. Then an encryption engine 102 may encrypt the video feed and broadcast it to users via, by way of example only, radio-transmission (e.g., via antenna 1010), CATV, or Internet 105. It will be understood that other suitable ways to broadcast can also be used.

In this embodiment, individual encryption of the data for each user is often impractical. Accordingly, in one embodiment, the broadcast can be performed with as few as one symmetric key for all the users. Then, a specific broadcast may be associated with specific display devices 120 using a procedure similar to the procedure shown on FIG. 4, though at step 440 (the finding of the symmetric key), the symmetric key would be found only by content ID (i.e., without also searching by user ID), as the symmetric key is the same for all users. In such an embodiment, broadcast symmetric keys could be changed with some regularity, such as based on time (e.g., once per day), based on the type of broadcast, or based on a specific broadcast. However, because encrypting new symmetric keys for all television sets (with numbers in the range of millions) could take a long time, it may be desirable to generate and encrypt new symmetric keys for each television set in advance of the content becoming available for users.

While the foregoing example has discussed television broadcasts, it will be obvious that this embodiment, using a single symmetric key for all distributed content, is not necessarily restricted to broadcasting and could be used in a number of different applications.

It should be noted that the security of a system as discussed herein depends in part on ensuring that the symmetric keys stored in the database 103 remain secure. In some embodiments, to increase the security, it may be desirable to avoid storing symmetric keys in database 103 altogether by joining requests of purchase and association together, and by issuing a unique symmetric key for each triplet of user ID, content ID and display device ID. Then, the unique symmetric key could be encrypted with the display device's public key and sent back to the local device 110 as a reply to request of "purchase and associate" request. In this case, the symmetric key does not need to be stored in database 103, which improves the security of the system; as a drawback, however, the user will need to re-download the content for each of his/her display devices.

The foregoing discussion has focused on techniques for deterring unauthorized access to media content at the logical level. As such, the foregoing discussion has not focused on methods of preventing attacks at the physical level, such as by disassembling the display device 120 and reading data from the physical connectors, especially those coming to screen 123. However, many known techniques can be used to make physical attacks more difficult, including both tamper-resistant and tamper-responding technologies.

Certain special measures may be taken to prevent attacks aimed to circumvent re-programming of the display device 120; such special measures might include, among other things, a) not allowing re-programming of the display device 120 with a new program unless it is digitally signed (with a certificate or public key for such signature being stored within the display device 120), b) keeping crypto-sensitive operations, as well as the private key 127, within a non-reprogrammable portion of non-volatile memory 125, with hardware restricting the re-programmable portion from accessing the private key 127 or any symmetric key in any way except as described herein, and/or c) implementing cryptography and decoding operations completely in hardware.

It will be understood that, though the present discussion has focused on communication with a single media distribution outlet 100, devices according to the present disclosure may interact with multiple different outlets. To expedite processing of user requests, the operating system 111 may remember from which media distribution outlet 100 it has purchased certain content, and direct association requests for that content to the appropriate outlet 100.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of microprocessors, microcontrollers, field programmable gate arrays (FPGAs), application specific integrated circuits (ASICs), and/or System on a Chip (SoC)—but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

What is claimed is:

1. A system for displaying encrypted media content comprising:
   a local device, comprising:
   a computer processor configured to control playing of the encrypted media content including performing a navigation control operation using unencrypted media meta data;
   a first communication interface configured to transmit an association encryption envelope and, according to the navigation control operation, the encrypted media content; and
   a display device, comprising:
   a second communication interface coupled to the first interface configured to receive the encrypted media content and the association encryption envelope transmitted by the local device;
   a decryption engine configured to decrypt, using a private key of the display device, the association encryption envelope to recover a symmetric encryption key used to encrypt the encrypted media content and decrypt the encrypted media content using the recovered symmetric encryption key; and
   a decoder configured to decode the decrypted media content for display on a display screen according to the navigation control operation.

2. The system of claim 1, further comprising:
   a source device, comprising:
   a processor configured to:
   generate the symmetric key;
   retrieve a public key of the display device based on a display device identifier identifying the display device, wherein the public and private keys of the display device are a pair of asymmetric keys assigned to the display device; and
   generate the association encryption envelope; and
   an encryption engine configured to encrypt the media content using the symmetric key and encrypt the association encryption envelope using the retrieved public key of the display device.

3. The system of claim 2, wherein the source device is configured to access a key database to retrieve the public key of the display device.

4. The system of claim 2, wherein the public and private keys of the display device are generated when the display device is manufactured.

5. The system of claim 2, wherein the display device stores the private key in a tamper-resistant or tamper-evident nonvolatile memory of the display device not accessible by the local device.

6. The system of claim 1, wherein the navigation control operation is performed in response to user actions.

7. The system of claim 1, wherein performing the navigation control operation includes performing one of play, seek, fast forward, or backward operations.

8. The system of claim 1, wherein the encrypted media content includes a digital water mark.

9. The system of claim 1, wherein the display device further comprises an image processor and a z-order processor to display a still image over the decrypted media content on the display screen.

10. The system of claim 1, wherein the local and display devices are packaged together in a combined device, wherein the combined device comprises a mixer that allows an appropriate area of the display screen to display the decrypted media content generated by the description engine and rest of the display screen under direct control of the operating system, wherein the mixer prohibits the operating system from accessing a buffer storing the decrypted media content.

11. The system of claim 1, wherein the encrypted media content includes a plurality of encrypted video and/or audio chunks.

12. The system of claim 1, wherein the local device is a desktop computer, a laptop, or a set-top box and the display device is a television set or a monitor.

13. A display device for receipt and display of encrypted media content comprising:
a non-volatile memory storing a private key of the display device;
a communication interface coupled to a controlling device and configured to receive from the controlling device the encrypted media content and an association encryption envelope;
a decryption engine configured to decrypt, using the private key of the display device, the association encryption envelope to recover a symmetric encryption key used to encrypt the encrypted media content and decrypt the encrypted media content using the recovered symmetric encryption key; and
a decoder configured to decode the decrypted media content for display on a display screen according to a navigation control operation performed by the controlling device using unencrypted media meta data.

14. The display device of claim 13, wherein the association encryption envelope is generated at the source device and encrypted using a public key of the display device located according to a display device identifier identifying the display device, wherein the public and private keys of the display device are a pair of asymmetric keys assigned to the display device.

15. The display device of claim 14, wherein the public and private keys of the display device are generated when the display device is manufactured.

16. The display device of claim 13, wherein the display device stores the private key in a tamper-resistant or tamper-evident nonvolatile memory of the display device not accessible by the controlling device.

17. The display device of claim 13, wherein the navigation control operation is performed in response to user actions.

18. The display device of claim 13, wherein the navigation control operation performed by the controlling device includes one of play, seek, fast forward, or backward operations.

19. The display device of claim 13, wherein the encrypted media content includes a digital water mark.

20. The display device of claim 13, wherein the display device further comprises an image processor and a z-order processor to display a still image over the decrypted media content on the display screen.

21. The display device of claim 13, wherein the controlling device and display device are packaged together in a combined device, wherein the combined device comprises a mixer that allows an appropriate area of the display screen to display the decrypted media content generated by the description engine and rest of the display screen under direct control of an operating system of the controlling device, wherein the mixer prohibits the operating system from accessing a buffer storing the decrypted media content.

22. The display device of claim 13, wherein the encrypted media content includes a plurality of encrypted video and/or audio chunks.

23. The display device of claim 13, wherein the controlling device is a desktop computer, a laptop, or a set-top box and the display device is a television set or a monitor.

24. A method for displaying encrypted media content on a display device, comprising:
receiving, from a controlling device, the encrypted media content and an association encryption envelope;
decrypting, using a private key of the display device, the association encryption envelope to recover a symmetric encryption key used to encrypt the encrypted media content and decrypt the encrypted media content using the recovered symmetric encryption key; and
decoding the decrypted media content for display on a display screen according to a navigation control operation performed by the controlling device using unencrypted media meta data.

25. The method of claim 24, wherein the association encryption envelope is generated at the source device and encrypted using a public key of the display device located according to a display device identifier identifying the display device, wherein the public and private keys of the display device are a pair of asymmetric keys assigned to the display device.

26. The method of claim 25, wherein the public and private keys of the display device are generated when the display device is manufactured.

27. The method of claim 24, wherein the display device stores the private key in a tamper-resistant or tamper-evident nonvolatile memory of the display device not accessible by the controlling device.

28. The method of claim 24, wherein the navigation control operation is performed in response to user actions.

29. The method of claim 24, wherein the navigation control operation performed by the controlling device includes one of play, seek, fast forward, or backward operations.

30. The method of claim 24, wherein the encrypted media content includes a digital water mark.

31. The method of claim 24, wherein the display device further comprises an image processor and a z-order processor to display a still image over the decrypted media content on the display screen.

32. The method of claim 24, wherein the controlling device and display device are packaged together in a combined device, wherein the combined device comprises a mixer that allows an appropriate area of the display screen to display the decrypted media content generated by the description engine and rest of the display screen under direct control of an operating system of the controlling device, wherein the mixer prohibits the operating system from accessing a buffer storing the decrypted media content.

33. The method of claim 24, wherein the encrypted media content includes a plurality of encrypted video and/or audio chunks.

34. The method of claim 24, wherein the controlling device is a desktop computer, a laptop, or a set-top box and the display device is a television set or a monitor.

* * * * *